(12) United States Patent  (10) Patent No.: US 7,400,634 B2
Higashitaniguchi et al.  (45) Date of Patent: Jul. 15, 2008

(54) MAC ADDRESS LEARNING APPARATUS

(75) Inventors: Atsuko Higashitaniguchi, Yokohama (JP); Hiroshi Kinoshita, Yokohama (JP); Satsuki Norimatsu, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 656 days.

(21) Appl. No.: 11/038,282

(22) Filed: Jan. 21, 2005

(65) Prior Publication Data

US 2006/0092860 A1  May 4, 2006

(30) Foreign Application Priority Data

Oct. 28, 2004  (JP) .............................. 2004-314152

(51) Int. Cl.
*H04L 12/56* (2006.01)
(52) U.S. Cl. .................. 370/395.53; 370/255; 370/397; 709/249
(58) Field of Classification Search ................ 370/230, 370/254–256, 384, 351, 395.53, 397, 399, 370/395.3; 709/236, 220, 249
See application file for complete search history.

(56) References Cited

U.S. PATENT DOCUMENTS

2003/0037163 A1* 2/2003 Kitada et al. ................ 709/236
2004/0223500 A1* 11/2004 Sanderson et al. ..... 370/395.53
2005/0180391 A1* 8/2005 Shimada ..................... 370/351

FOREIGN PATENT DOCUMENTS

| JP | 3001735 | 1/1991 |
| JP | 4360336 | 12/1992 |
| JP | 6069927 | 3/1994 |

* cited by examiner

*Primary Examiner*—John Pezzlo
(74) *Attorney, Agent, or Firm*—Bingham McCutchen LLP

(57) ABSTRACT

In a network providing a wide-area LAN service which allows communications to be performed between user networks (12, 13) via a carrier network (11), edge switches (14, 15) each comprise: a tentative learning registration means (16) which, when a packet whose source MAC address and receiving port are not yet learned is received from the carrier network, registers the source MAC address and the receiving port in a tentatively learned state; a learned state changing means (17) which changes the learned state of the destination MAC address of a packet received from an associated one of the user networks to a permanently learned state; and a permanent learning registration means which, when a packet whose destination MAC address is registered in a learned state is received from the carrier network, registers the source MAC address and receiving port of the packet received from the carrier network in a permanently learned state. The invention thus provides a MAC address learning apparatus that improves the hit rate in a MAC address learning table maintained in each of the edge switches (14, 15) provided in a wide-area VLAN carrier network.

12 Claims, 30 Drawing Sheets

Fig.16

| MAC ADDRESS | VLAN ID | PORT NUMBER |
|---|---|---|
| 00-E0-00-00-10-10 | 1 | 1 |
| : | : | : |

| LEARNED STATE | AGING TIME |
|---|---|
| 1 | 300s |
| 0 | 3s |

| MAC ADDRESS | VLAN ID | PORT NUMBER | LEARNED STATE | AGING TIME |
|---|---|---|---|---|
| 00-E0-00-00-10-10 | 1 | 1 | 0 | 3s |
| – | – | – | – | – |
| – | – | – | – | – |

Fig.19

| MAC ADDRESS | VLAN ID | PORT NUMBER |
|---|---|---|
| 00-E0-00-00-10-20 | 1 | 2 |
| : | : | : |

| MAC ADDRESS | VLAN ID | PORT NUMBER | LEARNED STATE | AGING TIME |
|---|---|---|---|---|
| 00-E0-00-00-10-10 | 1 | 1 | 1 | 300s |
| - | - | - | - | - |
| - | - | - | - | - |

| MAC ADDRESS | VLAN ID | PORT NUMBER | LEARNED STATE | AGING TIME |
|---|---|---|---|---|
| 00-E0-00-00-10-20 | 1 | 2 | 0 | 3s |
| - | - | - | - | - |
| - | - | - | - | - |

| MAC ADDRESS | VLAN ID | PORT NUMBER | LEARNED STATE | AGING TIME |
|---|---|---|---|---|
| 00-E0-00-00-10-20 | 1 | 2 | 1 | 300s |
| - | - | - | - | - |
| - | - | - | - | - |

Fig.24

| MAC ADDRESS | VLAN ID | PORT NUMBER | LEARNED STATE | AGING TIME |
|---|---|---|---|---|
| 00-E0-00-00-10-20 | 1 | 1 | 1 | 300s |
| 00-E0-00-00-10-10 | 1 | 1 | 0 | 3s |
| 00-E0-00-00-20-20 | 2 | 1 | 0 | 3s |

Fig.25

| MAC ADDRESS | VLAN ID | PORT NUMBER | LEARNED STATE | AGING TIME |
|---|---|---|---|---|
| 00-E0-00-00-10-20 | 1 | 1 | 1 | 300s |
| 00-E0-00-00-20-10 | 2 | 1 | 0 | 3s |
| 00-E0-00-00-20-20 | 2 | 1 | 0 | 3s |

Fig. 26

| MAC ADDRESS | VLAN ID | PORT NUMBER | LEARNED STATE | AGING TIME |
|---|---|---|---|---|
| 00-E0-00-00-10-20 | 1 | 1 | 1 | 300s |
| 00-E0-00-00-10-10 | 1 | 1 | 0 | 3s |
| 00-E0-00-00-20-10 | 2 | 1 | 0 | 3s |

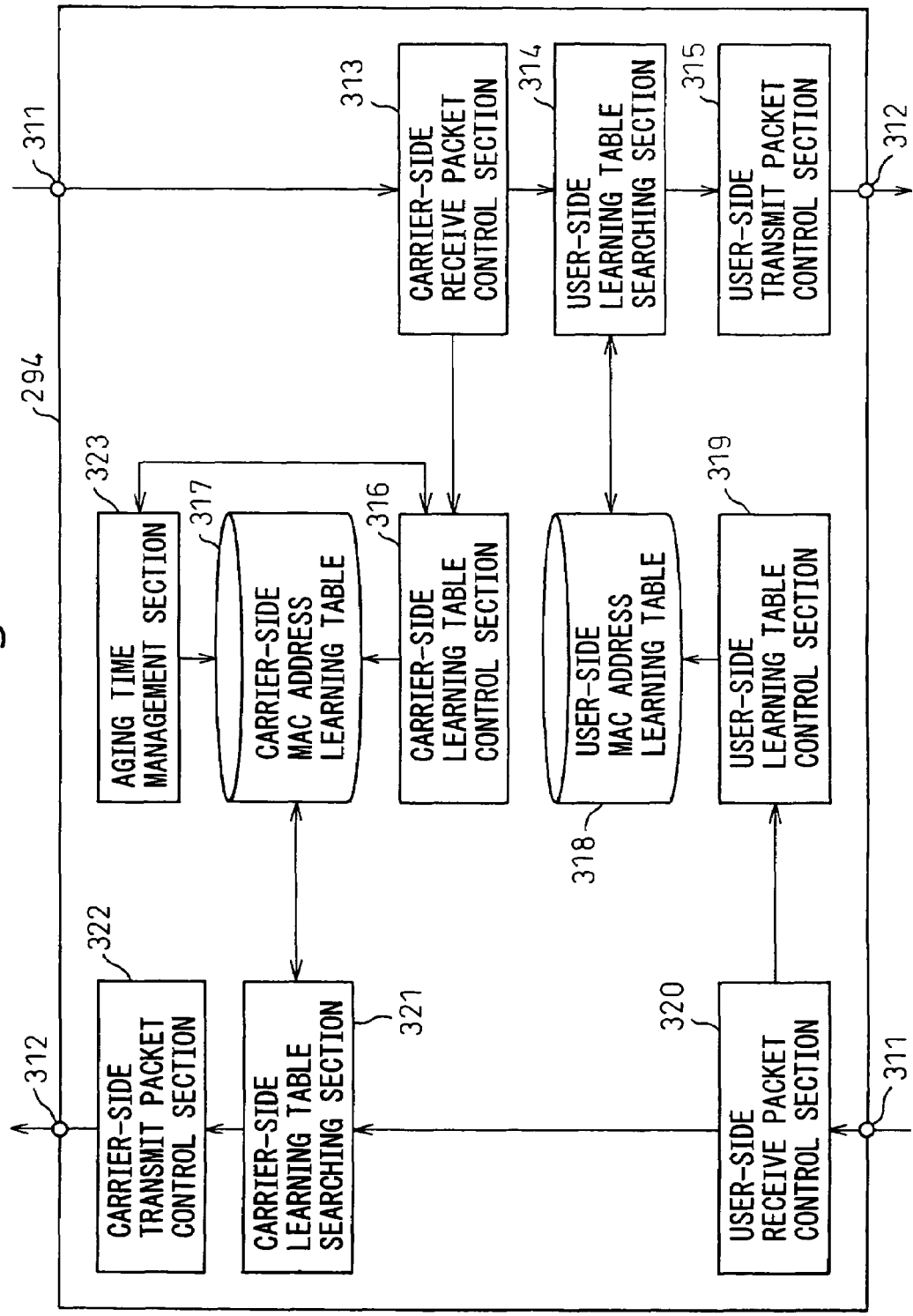

MAC ADDRESS LEARNING APPARATUS

CROSS-REFERENCE TO RELATED APPLICATIONS

This application is based upon and claims the priority of Japanese Patent Application No. 2004-314152, filed on Oct. 28, 2004, the contents being incorporated herein by reference.

TECHNICAL FIELD

The present invention relates to a MAC address learning apparatus and, more particularly, to a MAC address learning apparatus that is used in data transmission equipment intended for use by communications carriers who provide a wide-area VLAN, or a similar service, which has been attracting attention in recent years.

BACKGROUND ART

A wide-area VLAN service, which is primarily used to connect corporate LANs, is a field where far more MAC address learning is needed than in corporate VLANs.

Generally, when a corporation or like entity constructs a private network, several methods, which include a method that uses a private line, a method that uses an IP-VPN (Virtual Private Network) using IP (Internet Protocol), and a method that uses a VLAN (Virtual LAN) through the use of wide-area LAN service, are available. Among others, wide-area LAN service is widespread because of cost advantages over private lines and IP-VPNs and because of the ease of management.

Wide-area LAN service requires the use of layer 2 switches to ensure transmission of LAN data without interference between a plurality of corporations. To achieve this, a technology is employed that assigns a unique VLAN ID to each individual corporation and identifies the destination of the data based on the VLAN ID. More specifically, when an Ethernet packet is sent out from a corporation, a VLAN ID is assigned in an edge switch at the entrance to the carrier network, and the VLAN ID is checked in a core switch, within the carrier network, to transfer the packet.

Usually, a layer 2 switch maintains a MAC address learning table which stores the source MAC address, VLAN ID, and receiving port of each received packet. When relaying the packet, the table is searched by using the destination MAC address and VLAN ID of the packet; if there is no matching entry, the packet is transferred to all ports to which the VLAN ID belongs, but if there is a matching entry, the packet is transferred only to its associated port. This prevents unnecessary packet transfers. Each entry is aged out (removed from the learning table) unless it is referred to within a predetermined period of time. This period of time is called the aging time.

FIG. 29 is a schematic diagram for explaining a MAC address learning method according to the prior art. In the figure, a user network 291 (VLAN ID=1), a user network 292 (VLAN ID=1), and a user network 293 (VLAN ID=2) are connected as a VLAN via a carrier network 290. Here, the user network 291 (VLAN ID=1) and the user network 292 (VLAN ID=1), for example, are networks operated within the same corporation, while the user network 293 (VLAN ID=2) is a network operated within another corporation.

Terminals A, B, . . . are attached to the respective user networks 291, 292, and 293. The carrier network 290 comprises edge switches 294, 295, 296, etc. located at the edge of it and core switches 297, 298, 299, etc. located inside it. The edge switches and the core switches are each provided with a MAC address learning table T. In the figure, only the MAC address table T maintained in the edge switch 294 is shown as a representative example.

Next, the operation of the VLAN shown in FIG. 29 will be described briefly by way of example. When the terminal A (MAC address=a) in the user network 291 (VLAN ID=1) sends out a packet destined for the terminal B (MAC address=a) in the user network 292 that has the same VLAN ID, the MAC address learning table in each of the edge switches and core switches is searched by using the destination MAC address=b and the VLAN ID=1 as keywords. At first, as the destination MAC address=b is not registered, that is, not learned, in the MAC address learning table in any of the switches, the packet is broadcast from each switch in the carrier network 290. As a result, the terminal A is learned at all the switches, i.e., the edge switch 294, the core switch 297, the edge switch 295, the core switch 298, the core switch 299, and the edge switch 296.

Next, when the terminal B sends out a return packet to the terminal A, as the MAC address=a of the destination terminal A is already learned at the edge switch 295, the core switch 297, and the edge switch 294, the packet is not broadcast, but is transferred via the edge switch 295, the core switch 297, and the edge switch 294. However, the probability of using the learned MAC address of the terminal A at the other switches, i.e., the core switch 298, the core switch 299, and the edge switch 296, is low. When the learned MAC address of the terminal A is not used, the learning of the terminal A at these other switches will be of no use.

As the number of users, for example, corporations, subscribing to wide-area LAN service increases, and as a result, the number of terminals connected to the network increases, the number of MAC addresses passing through the network rapidly increases. If there are one thousand terminals in the user network 291, for example, each MAC learning table must have one thousand entries. Here, any packet for which there is no matching entry in the MAC learning table is transferred (broadcast) to all the ports of the switch as described above. As a result, the MAC address is learned at every switch in the carrier network that received the packet, hence the problem that the MAC address learning table becomes saturated.

As a means for solving this problem, EoE (Ethernet over Ethernet) technology devised by PoweredCom is attracting attention. EoE is a technology in which a packet transmitted from a user network is converted at an edge switch into an EoE-MAC address format used in the EoE network for transmission through the carrier network. This serves to reduce the load since the MAC addresses that must be learned at each core switch are only the EoE-MAC addresses of the edge switches.

FIG. 30 is a schematic diagram for explaining packet transmission and reception when the prior art EoE technology is used. In the figure, a user network (VLAN ID=1) 301 and a user network (VLAN ID=1) 302 are connected as a VLAN via a carrier network 300. The user network (VLAN ID=1) 301 contains terminals A and B, as an example. The user network (VLAN ID=1) 302 contains terminals C and D, as an example. The carrier network 300 comprises edge switches 303, 304, etc. located at the edge of it and core switches 305, etc. located inside it. The edge switches 303 and 304 are each provided with a MAC address learning table T1. In the figure, only the MAC address learning table T1 maintained in the edge switch 303 is shown as a representative example. The core switch 305 is provided with a MAC address learning table T2. The contents of the MAC address learning tables T1 and T2 shown here indicate the states after learning is done.

Next, the operation of the VLAN shown in FIG. 30 will be described briefly. The description deals with the case in which the terminal A (MAC address=a) in the user network 301 (VLAN ID=1) sends out a packet destined for the terminal C (MAC address=c) in the user network 302 (VLAN ID=1). In the EoE technology, EoE-MAC addresses e1, e2, . . . are set at the user-network-side ports of the respective edge switches. The EoE-MAC addresses are addresses applicable only within the carrier network 300. More specifically, EoE-MAC address e1 is set on port 1 of the edge switch 303, and EoE-MAC address e2 is set on port 2 of the edge switch 304.

Reference numeral 306 indicates the packet sent out from the terminal A; "c" in the leftmost part of the packet 306 indicates the destination, and "a" to the right of it indicates the source. When the packet 306 is received from the terminal A, the edge switch 303 sets the source EoE-MAC address corresponding to the received source address "a" to e1 at its receiving port 1.

Further, the destination EoE-MAC address=e2 is retrieved by searching the MAC address learning table T1 based on the destination MAC address="c" and VLAN ID=1. Then, the packet 306 is converted into a packet 307 encapsulated with e1 as the source EoE-MAC address and e2 as the destination MAC address, and the packet 307 is transmitted through the carrier network 300. The core switch 305 in the carrier network 300 searches the MAC address learning table T2 by using the destination EoE-MAC address=e2 as the keyword, and transfers the packet 307 to the port 2 obtained as the result of the search.

The edge switch 304 removes the capsule containing the source EoE-MAC address e1 and the destination EoE-MAC address e2 from the head of the packet, and transmits the packet to the terminal C. This reduces the load since the core switch 305 need only learn the EoE-MAC addresses e1 and e2 of the edge switches 303 and 304 in the carrier network 300. In the prior art of FIG. 29, each MAC address learning table T2 in the carrier network has had to learn the MAC addresses of all the terminals a, b, c, and d; by contrast, in the prior art of FIG. 30, by using the EoE-MAC addresses e1, e2, . . . applicable only in the carrier network, the contents of the MAC address learning table maintained in the core switch 305 can be dramatically reduced.

FIG. 31 is a block diagram showing the configuration of the prior art edge switch 294 shown in FIG. 29. In the figure, reference numeral 311 is a port on the carrier network side, 312 is a port 1 on the user network side, 313 is a carrier-side receive packet control section, 314 is a user-side learning table searching section, 315 is a user-side transmit packet control section, 316 is a carrier-side learning table control section, 317 is a carrier-side MAC address learning table, 318 is a user-side MAC address learning table, 319 is a user-side learning table control section, 320 is a user-side receive packet control section, 321 is a carrier-side learning table searching section, 322 is a carrier-side transmit packet control section, and 323 is an aging time management section which manages the aging time for each entry of learned information in the carrier-side MAC address learning table and removes aged information contents from the carrier-side MAC address learning table 317. The carrier side here means the carrier network side, and the user side means the user network side.

Next, the operation of the edge switch shown in FIG. 31 will be described briefly.

First, a description will be given of the case where a packet is transmitted to the edge switch 294 from the carrier network 290 side.

When the packet is received from the carrier-network-side port 311, the carrier-side receive packet control section 313 requests the carrier-side learning table control section 316 to register the source address and the receiving port into the contents of the carrier-side MAC address learning table 317 (T in FIG. 29).

Then, the carrier-side learning table control section 316 registers the source address of the packet and its receiving port into the carrier-side MAC address learning table 317.

Next, based on the destination MAC address of the packet, the user-side MAC address learning table (of the same format as T in FIG. 29) provided in association with the user-side port is searched to retrieve the user-network-side port number to which the packet is to be transmitted. Based on the result of the search of the user-side MAC address learning table 318, the user-side transmit packet control section 315 transfers the packet to the designated transmit port on the user network side. If there is no matching transmit port number on the user network side, the packet is broadcast to all the terminals in the user network.

On the other hand, when a packet is transmitted to the edge switch 295 from the user network 292, the user-side receive packet control section 320, upon receiving the packet from the user-network-side port 311, requests the user-side learning table control section 319 to register the source address and the receiving port into the contents of the user-side MAC address learning table 318.

Then, the user-side learning table control section 319 registers the source address of the packet and its receiving port into the user-side MAC address learning table 318.

Next, based on the destination MAC address of the packet, the carrier-side learning table searching section 321 searches the carrier-side MAC address learning table 317 (T in FIG. 29) provided in association with the carrier-side port, and retrieves the carrier-network-side port number to which the packet is to be transmitted. Based on the result of the search of the carrier-side MAC address learning table, the carrier-side transmit packet control section 322 transfers the packet to the designated transmit port on the carrier network side. If there is no matching transmit port number on the carrier network side, the packet is broadcast to all the switches in the carrier network.

The aging time management section 323 removes information from the carrier-side MAC address learning table 317 by determining that the information is not in use if its learned contents have not been updated for a predetermined period of time, for example, 300 seconds.

[Patent Document 1] Japanese Unexamined Patent Publication No. H03-001735

[Patent Document 2] Japanese Unexamined Patent Publication No. H04-360336

[Patent Document 3] Japanese Unexamined Patent Publication No. H06-69927

[Non-patent Document 1] Nikkei Communications, Nov. 24 2003, No. 403, pp. 73-81

DISCLOSURE OF THE INVENTION

Problem to be Solved by the Invention

In the above prior art EoE technology shown in FIG. 30, the capacity of the MAC address learning table maintained in each core switch in the carrier network can be reduced, but each edge switch still needs to learn the MA addresses of all the terminals attached to the user network, hence the problem that the MAC address learning table becomes saturated. In particular, in wide-area LAN service, as the number of terminals connected to the carrier network increases rapidly, the MAC address learning table in each edge switch easily saturates; as a result, the hit rate in the MAC address learning table decreases, and hence the number of packets broadcast to the carrier network increases, resulting in the problem that the packet flow rate in the carrier network decreases.

To solve the above problem associated with the prior art, it is an object of the present invention to eliminate unnecessary learning in the MAC address learning table maintained in each edge switch located in a wide-area VLAN carrier network at a position connected to a user network, and thereby to increase the hit rate in the MAC address learning table.

Means for Solving the Problem

To achieve the above object, according to a first aspect of the invention, there is provided, for use in a network providing a wide-area LAN service which allows communications to be performed between a plurality of second networks via a first network, a MAC address learning apparatus comprising edge switches located in the first network and connected to the second networks, wherein each of the edge switches comprises: a tentative learning registration means which, when a packet whose source MAC address and receiving port are not yet learned is received from the first network, registers the source MAC address and the receiving port in a tentatively learned state; a learned state changing means which, when a packet whose destination MAC address is registered in a learned state is received from an associated one of the second networks, changes the learned state of the destination MAC address to a permanently learned state; and a permanent learning registration means which, when a packet whose destination MAC address is registered in a learned state is received from the first network, registers the source MAC address and receiving port of the packet received from the first network in a permanently learned state.

According to a second aspect of the invention, the tentative learning registration means comprises: a first-network-side receive packet control section which, when the packet is first received from the first network, then makes a request that the source MAC address and receiving port of the received packet be registered in the tentatively learned state into a MAC address learning table at the side of the first network; and a first-network-side learning table control section which, when the source MAC address is not registered in the MAC address learning table at the side of the first network, then registers the MAC address and the receiving port in the tentatively learned state into the MAC address learning table at the side of the first network.

According to a third aspect of the invention, the learned state changing means comprises: a first-network-side learning table searching section which searches the MAC address learning table at the side of the first network by using the destination MAC address of the packet received from the associated one of the second networks and, when the destination MAC address is found registered in a tentatively learned state in the MAC address learning table at the side of the first network, then makes a request that the learned state of the destination MAC address be changed to the permanently learned state; and a first-network-side learning table control section which updates the registration of the destination MAC address to the permanently learned state.

According to a fourth aspect of the invention, the permanent learning registration means comprises: a second-network-side learning table searching section which searches the MAC address learning table at the side of the second network by using the destination MAC address of the packet received from the first network and, when the destination MAC address is found registered in the MAC address learning table at the side of the second network, then makes a request that the source address and receiving port of the received packet be registered in the permanently learned state; and a first-network-side learning table control section which updates the registration of the destination MAC address to the permanently learned state when the destination MAC address is found registered in a tentatively learned state in the MAC address learning table at the side of the first network.

According to a fifth aspect of the invention, each of the edge switches comprises: a MAC address learning table at the side of the first network which stores learned contents of the MAC address of the packet received from the first network; an aging time management section which manages a timeout period specific to each rank of learned information registered in the MAC address learning table at the side of the first network; and a first-network-side learning table control section which sets in the MAC address learning table at the side of the first network a result obtained by querying the aging time management section about rank-specific aging time.

Effect of the Invention

According to the first aspect of the invention, only when the destination MAC address of the packet received from the first network is registered in a learned state, are the source MAC address and receiving port of the packet registered in the permanently learned state, thus ranking the learned information according to its usage, which means that the source MAC address and receiving port of any packet registered in a tentatively learned state and not used for a predetermined period of time are not registered by the permanent learning registration means; this offers the effect of being able to prevent the MAC address learning table in the edge switch from becoming saturated.

According to the second aspect of the invention, the tentative learning registration means is configured so that when the MAC address is not registered in the MAC address learning table at the side of the first network, the MAC address and receiving port of the first received packet are temporarily registered in a tentatively learned state into the MAC address learning table at the side of the first network; this offers the effect that the saturation of the MAC address learning table at the side of the first network in the edge switch can be prevented further reliably.

According to the third aspect of the invention, provisions are made so that when the packet directed toward the first network is received from the second network, the tentatively learned state is ranked up to the permanently learned state, thus using the MAC address learning table at the side of the first network only with actually valid packets; this offers the effect of being able to further reliably prevent the saturation of the MAC address learning table at the side of the first network for the case where packets directed toward the first network are received from the second network.

According to the fourth aspect of the invention, provisions are made so that when the packet directed toward the second network is received from the first network, the tentatively learned state is ranked up to the permanently learned state, thus using the MAC address learning table at the side of the first network only with actually valid packets; this offers the effect of being able to further reliably prevent the saturation of the MAC address learning table at the side of the first network in the edge switch for the case where packets directed toward the second network are received from the first network.

According to the fifth aspect of the invention, since provisions are made to manage the timeout period according to the rank of the learned information, the effect is that the saturation of the MAC address learning table at the side of the first network can be prevented further reliably.

BRIEF DESCRIPTION OF THE DRAWINGS

FIG. 16 is a diagram showing, by way of example, the contents of a user-side MAC address learning table in an edge switch 14.

FIG. 17 is a diagram showing, by way of example, the contents of an aging time management table maintained in an aging time managing section 213.

FIG. 18 is a diagram showing the contents of a carrier-side MAC address learning table 209 in an edge switch 15 in which tentatively learned information has been registered.

FIG. 19 is a diagram showing the contents of the user-side MAC address learning table 214 in the edge switch 15 of FIG. 15 after the above registration has been made.

FIG. 20 is a diagram showing the carrier-side MAC address learning table 209 after updating.

FIG. 21 is a diagram showing the contents of the carrier-side MAC address learning table 209 after the tentative learning registration has been made.

FIG. 22 is a diagram showing the contents of the carrier-side MAC address learning table 209 in the edge switch 14 after updating the learned state to a permanently learned state.

FIG. 24 is a diagram showing the contents of the carrier-side MAC address learning table 209 in an edge switch 237 according to the second mode of the present invention, where the maximum number of table learning entries is three.

FIG. 25 is a diagram showing the updated contents of the carrier-side MAC address learning table 209 according to the second mode of the invention when the condition for deletion of tentatively learned information from the carrier-side MAC address learning table 209 is set so that tentatively learned information is deleted by searching in ascending order of table entries.

FIG. 26 is a diagram showing the updated contents of the carrier-side MAC address learning table 209 according to the second mode of the invention when the condition for deletion of tentatively learned information from the carrier-side MAC address learning table 209 is set so that tentatively learned information is deleted by searching based on the VLAN ID.

FIG. 31 is a block diagram showing the configuration of a prior art edge switch 294 shown in FIG. 29.

BEST MODE FOR CARRYING OUT THE INVENTION

Figure 1:
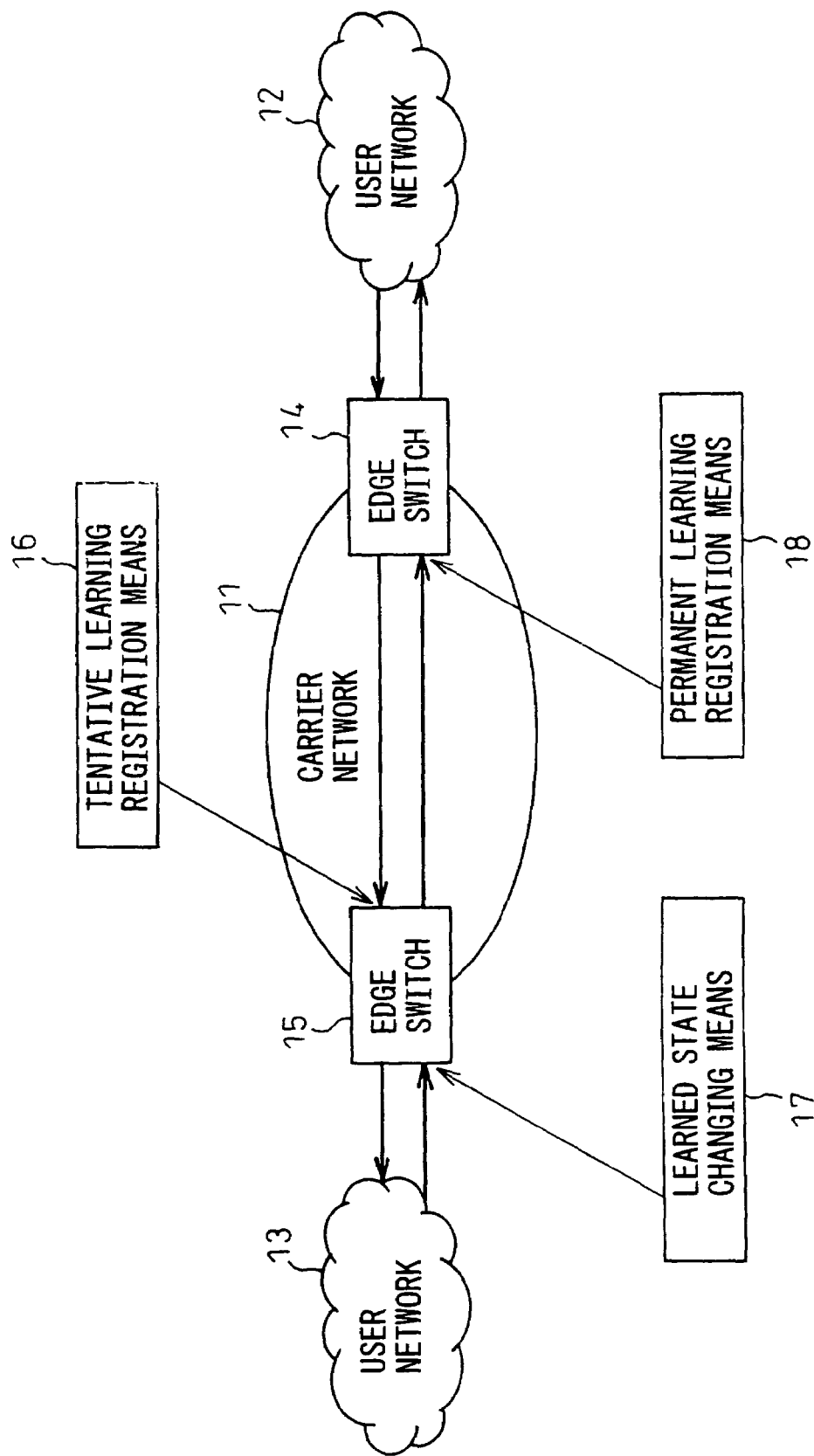
FIG. 1 is a diagram for explaining an outline of a MAC address learning apparatus according to one mode of the present invention.

Modes for carrying out the present invention will be described with reference to the drawings. Throughout the drawings, like reference numerals designate like parts.

The definitions of the symbols and data essential for the description of the embodiments of the invention are given below.

(1) An edge switch is a switch located in a carrier network (first network) and connected to a user network (second network).

(2) A core switch is a switch located in the carrier network but not connected to any user network.

(3) VLAN ID is an identifier for identifying a VLAN, and is a unique value in a layer 2 network.

(4) Learned information is information such as MAC addresses, VLAN IDs, port numbers, etc. registered in a MAC address learning table.

(5) Tentative learning refers to registering the learned information as tentatively learned information into the MAC address learning table.

(6) Permanent learning refers to registering the learned information as valid learned information into the MAC address learning table.

(7) A learned state refers to a tentatively learned state or a permanently learned state registered in a carrier-side MAC address learning table 209.

(8) Aging time is a predetermined period of time after which learned information is removed from the MAC address learning table unless the information is referred to within that period of time.

Mode 1

FIG. 1 is a diagram for explaining an outline of a MAC address learning apparatus according to a first mode of the present invention. As shown, in a network providing a wide-area LAN service which allows communications to be performed between second networks (hereinafter called the user networks) 12 and 13 via a first network (hereinafter called the carrier network) 11, the MAC address learning apparatus comprises edge switches 14 and 15 located in the carrier network 11 and connected to the respective user networks 12 and 13.

The edge switches 14 and 15 each include a tentative learning registration means 16 for registering the source MAC address and receiving port of a yet-to-be-learned packet received from the carrier network 11 into the carrier-side MAC address learning table 209 (see FIG. 2) in a tentatively learned state, and a learned state changing means 17 for searching the carrier-side MAC address learning table 209 based on the destination MAC address of a packet received from the user network 13 and, if the destination MAC address is registered in a learned state, then changing the learned state of the destination MAC address to a permanently learned state.

Further, the edge switches 14 and 15 each include a permanent learning registration means 18 for searching the user-side MAC address learning table 214 (see FIG. 2) based on the destination MAC address of a packet received from the carrier network 11 and, if the destination MAC address is registered in a learned state, then registering the source MAC address and receiving port of the packet received from the carrier network 11 into the carrier-side MAC address learning table 209 in a permanently learned state.

FIG. 1 specifically shows the case where a packet is first transmitted from the user network 12 toward the user network 13, and then a packet is transmitted from the user network 13 toward the user network 12, but there can, of course, occur the opposite case, where a packet is first transmitted from the user network 13 toward the user network 12, and then a packet is transmitted from the user network 12 toward the user network 13.

Figure 2:
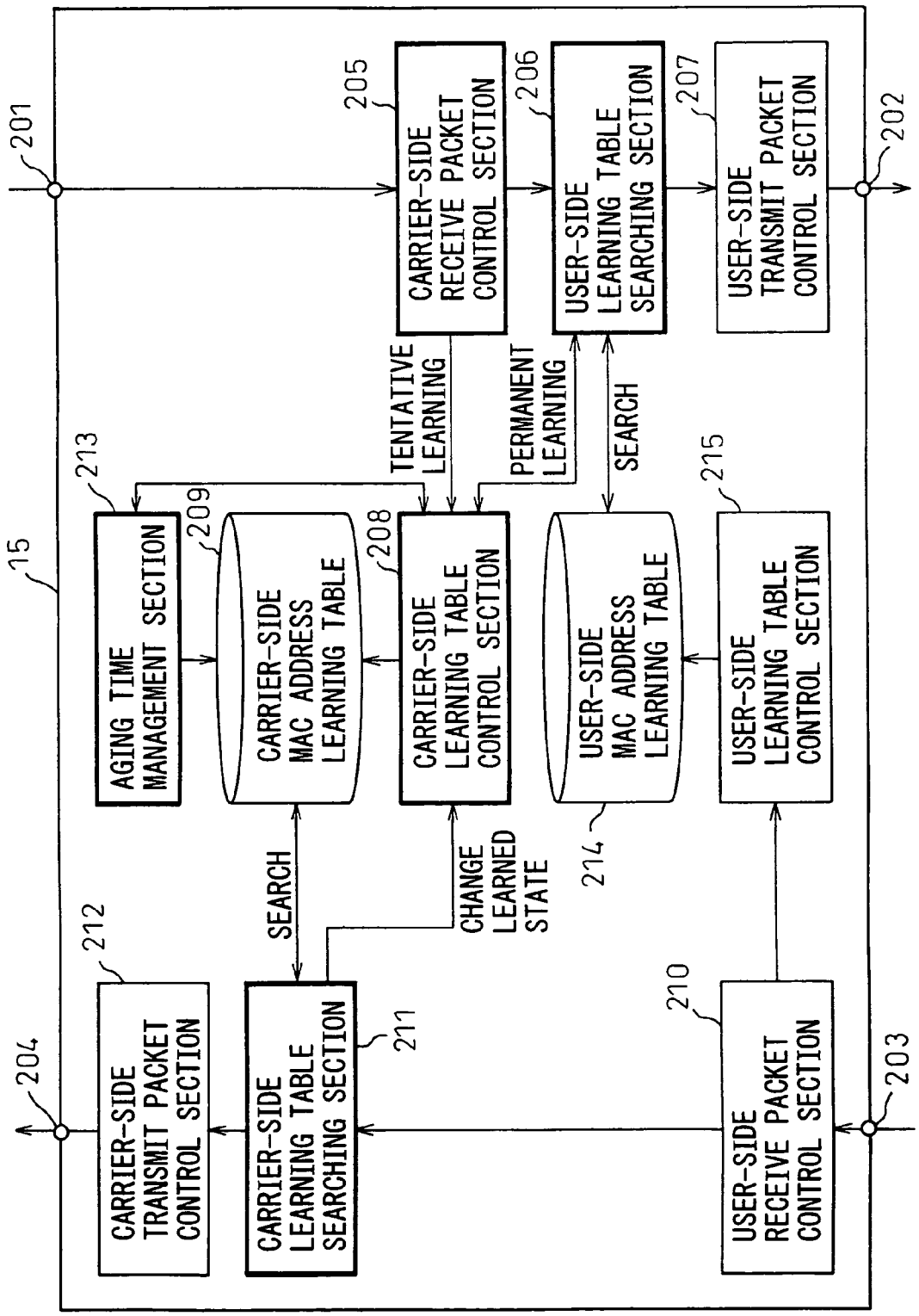
FIG. 2 is a block diagram schematically showing the configuration of an edge switch 15 shown in FIG. 1.

FIG. 2 is a block diagram schematically showing the configuration of the edge switch 15 shown in FIG. 1. In the figure, the blocks enclosed by thick lines are the sections modified according to the present invention.

The edge switch 15 comprises a carrier-network-side input port 201, a user-network-side output port 202, a user-network-side input port 203, a user-network-side output port 204, a carrier-side receive packet control section 205, a user-side learning table searching section 206, a user-side transmit packet control section 207, a carrier-side learning table control section 208, a carrier-side MAC address learning table 209, a user-side receive packet control section 210, a carrier-side learning table searching section 211, a carrier-side transmit packet control section 212, an aging time management section 213, a user-side MAC address learning table 214, and a user-side learning table control section 215.

The carrier-side receive packet control section 205 requests the carrier-side learning table control section 208 to register the source address and receiving port of a packet received from the carrier network 11 into the carrier-side MAC address learning table 209. In the present invention, the request is made to register the first received packet in a tentatively learned state.

Based on the destination MAC address of the packet first received from the carrier network 11, the user-side learning table searching section 206 searches the user-side MAC address learning table 214 and retrieves the user-network-side port number to which the packet is to be transmitted. In the present invention, if the destination MAC address is already registered, a request is made to the carrier-side learning table control section 208 to register the source address and receiving port of the packet in a permanently learned state.

Based on the result of the search of the user-side MAC address learning table 214, the user-side transmit packet control section 207 transfers the packet to the transmit port 202 on the user network 13 side.

The carrier-side learning table control section 208 registers the source MAC address and receiving port of the received packet into the carrier-side MAC address learning table 209. In the present invention, the first received packet is registered by ranking it as tentative learning, and any packet received thereafter is registered by ranking it as permanent learning.

The user-side learning table control section 215 registers the source address and receiving port of a packet received from the user network 13 into the user-side MAC address learning table 214.

The user-side receive packet control section 210 requests the user-side learning table control section 215 to register the source MAC address and receiving port of the packet received from the user network 13 into the user-side MAC address learning table 214.

Based on the destination MAC address of the packet received from the user network 13, the carrier-side learning table searching section 211 searches the carrier-side MAC address learning table 209 and retrieves the port number on the carrier network 11 side to which the packet is to be transmitted. In the present invention, if the destination MAC address is already registered in the carrier-side MAC address learning table 209, a request is made to the carrier-side learning table control section 208 to update the learned state in the carrier-side MAC address learning table 209 to the permanently learned state.

Based on the result of the search of the carrier-side MAC address learning table 209, the carrier-side transmit packet control section 212 transfers the packet to the designated transmit port on the carrier network 11 side.

The aging time management section 213 manages the aging time for each piece of learned information registered in the carrier-side MAC address learning table 209. Any learned information for which the aging time has expired is removed from the carrier-side MAC address learning table 209. In the present invention, the aging time is managed according to the rank of the learned state, i.e., the tentatively learned state and the permanently learned state.

Figure 3:
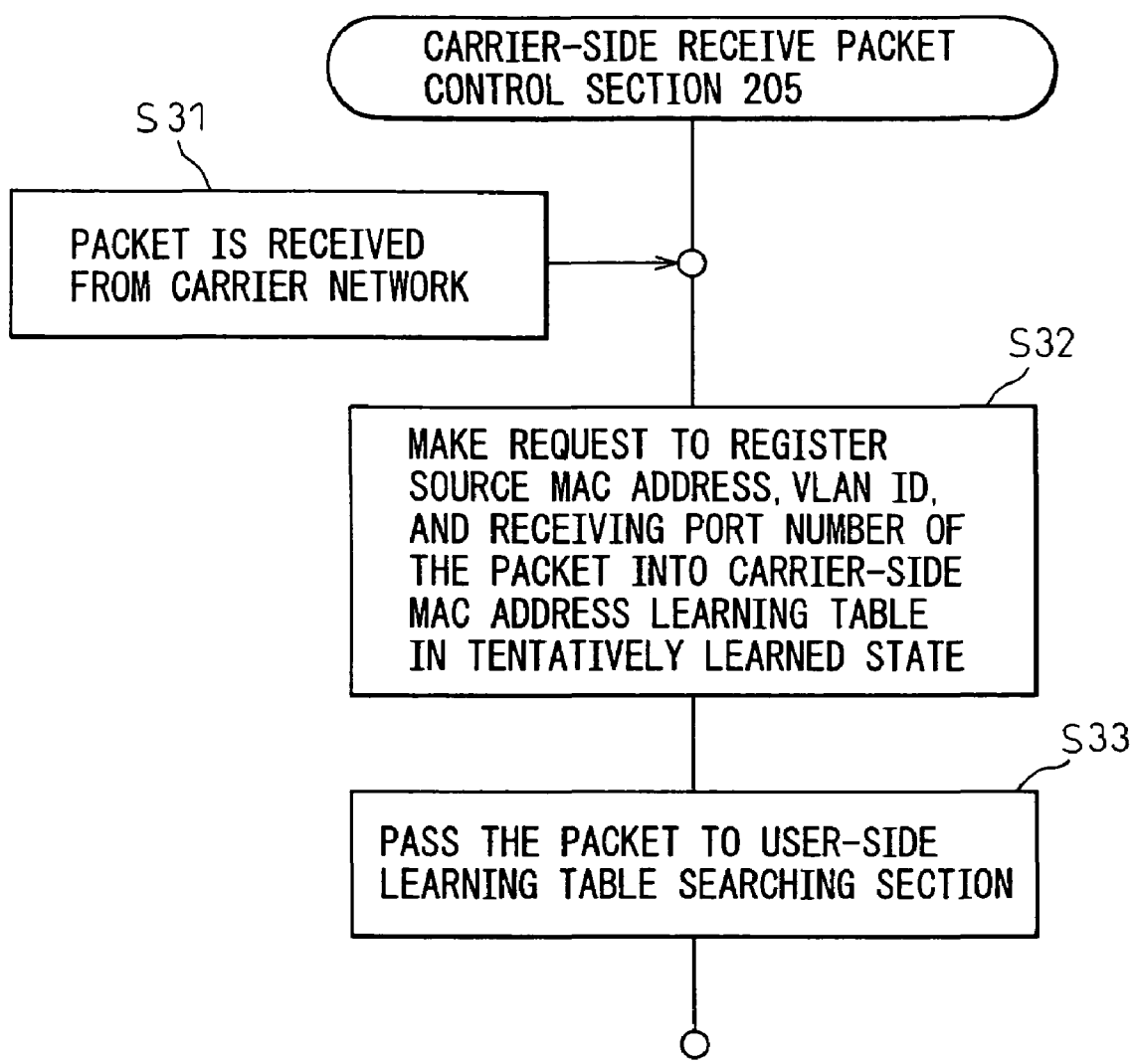
FIG. 3 is a flowchart for explaining an outline of the operation of a carrier-side receive packet control section 205 in FIG. 2.

FIG. 3 is a flowchart for explaining an outline of the operation of the carrier-side receive packet control section 205 in FIG. 2. In FIG. 3, a first packet is received in step S31 from the carrier network 11, and in step S32, a request is made to the carrier-side learning table control section 208 to register the source MAC address, VLAN ID, and receiving port number of the received packet into the carrier-side MAC address learning table 209 in a tentatively learned state. Next, in step S33, the received packet is passed to the user-side learning table searching section 206.

Figure 4:
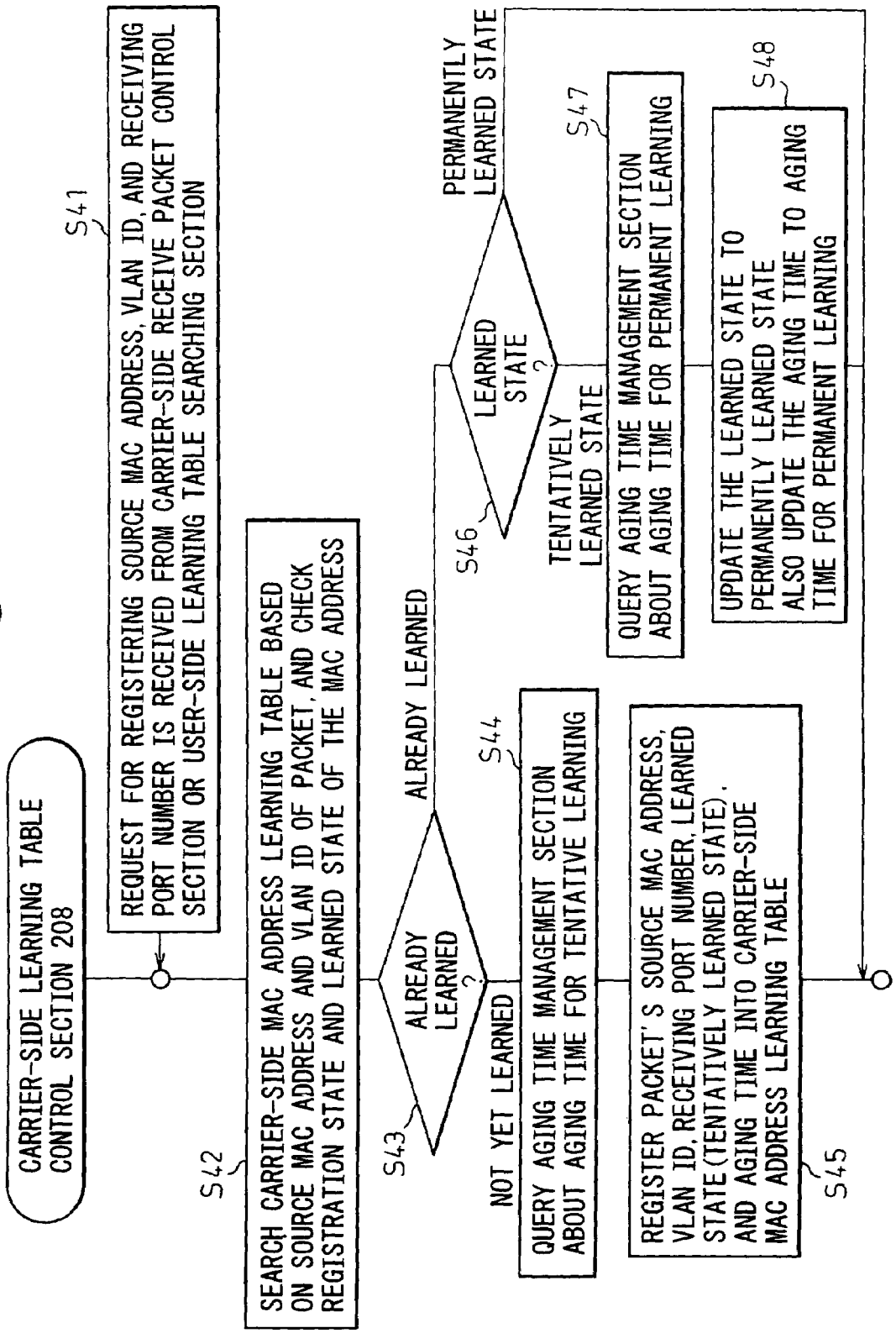
FIG. 4 is a flowchart for explaining an outline of the operation of a carrier-side learning table control section 208 when a packet is received from a carrier network.

FIG. 4 is a flowchart for explaining an outline of the operation of the carrier-side learning table control section 208 when a packet is received from the carrier network. In FIG. 4, a request for registering the source MAC address, VLAN ID, and receiving port number of the received packet is received in step S41 from the carrier-side receive packet control section 205 or the user-side learning table searching section 206.

Next, in step S42, the carrier-side MAC address learning table 209 is searched based on the source MAC address and VLAN ID of the packet, and the registration state and learned state of the source MAC address are checked.

If the result of the checking in step S43 shows that the source MAC address is not learned yet, the process proceeds to step S44 where a query is made to the aging time management section 213 about the aging time for tentative learning (for example, three seconds). Next, in step S45, the source MAC address, VLAN ID, and receiving port number of the packet, the aging time for tentative learning, and the tentatively learned state are registered in the carrier-side MAC address learning table 209.

On the other hand, if the result of the checking in step S43 shows that the source MAC address is already learned, the process proceeds to step S46 to check whether the learned state registered in the carrier-side MAC address learning table 209 is the tentatively learned state or the permanently learned state. If the state is the tentatively learned state, the process proceeds to step S47 where a query is made to the aging time management section 213 about the aging time for permanent learning (for example, 300 seconds). Next, in step S48, the tentatively learned state registered in the carrier-side MAC address learning table 209 is updated to the permanently learned state, and the aging time is also updated to the aging time for permanent learning.

Figure 5:
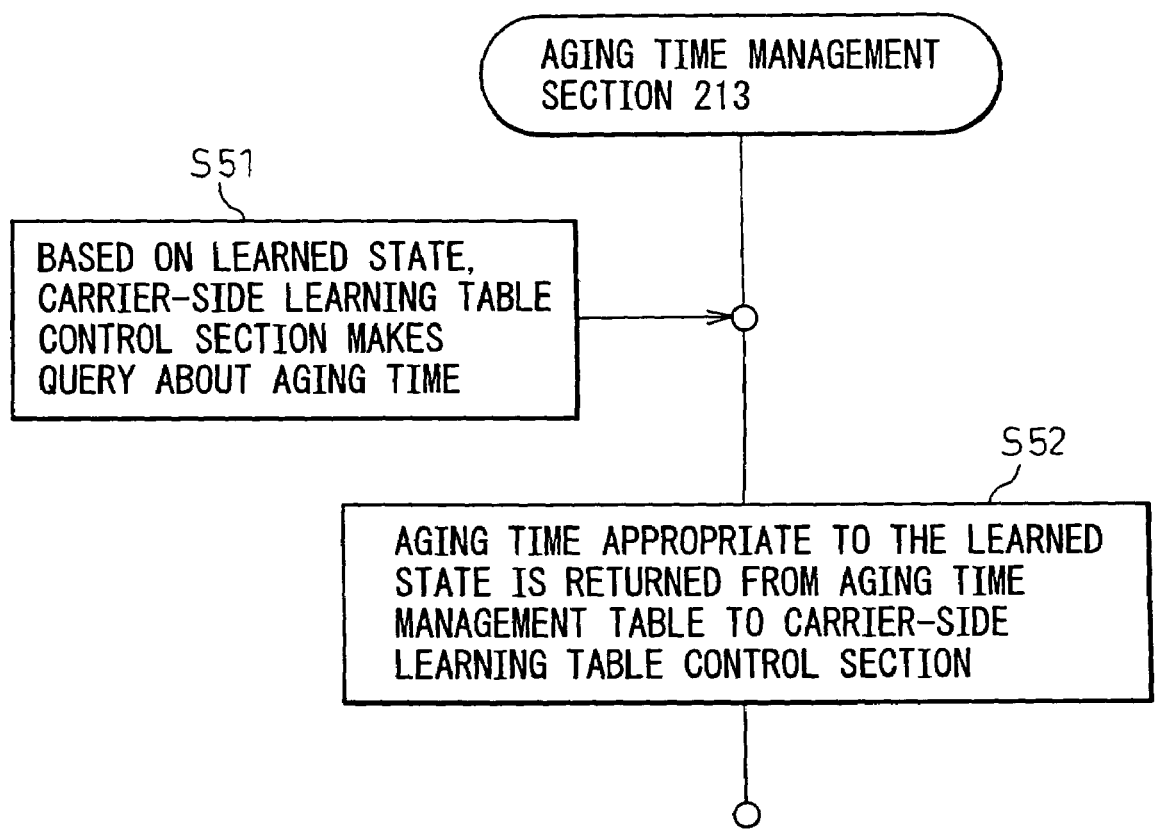
FIG. 5 is a flowchart for explaining an outline of the operation of an aging time management section 213.

FIG. 5 is a flowchart for explaining an outline of the operation of the aging time management section 213. In FIG. 5, based on the learned state of the received packet, the carrier-side learning table control section 208 in step S51 queries the aging time management section 213 about the aging time. Next, the aging time appropriate to the learned state of the received packet is returned from the aging time management section 213 to the carrier-side learning table control section 208.

Figure 6:
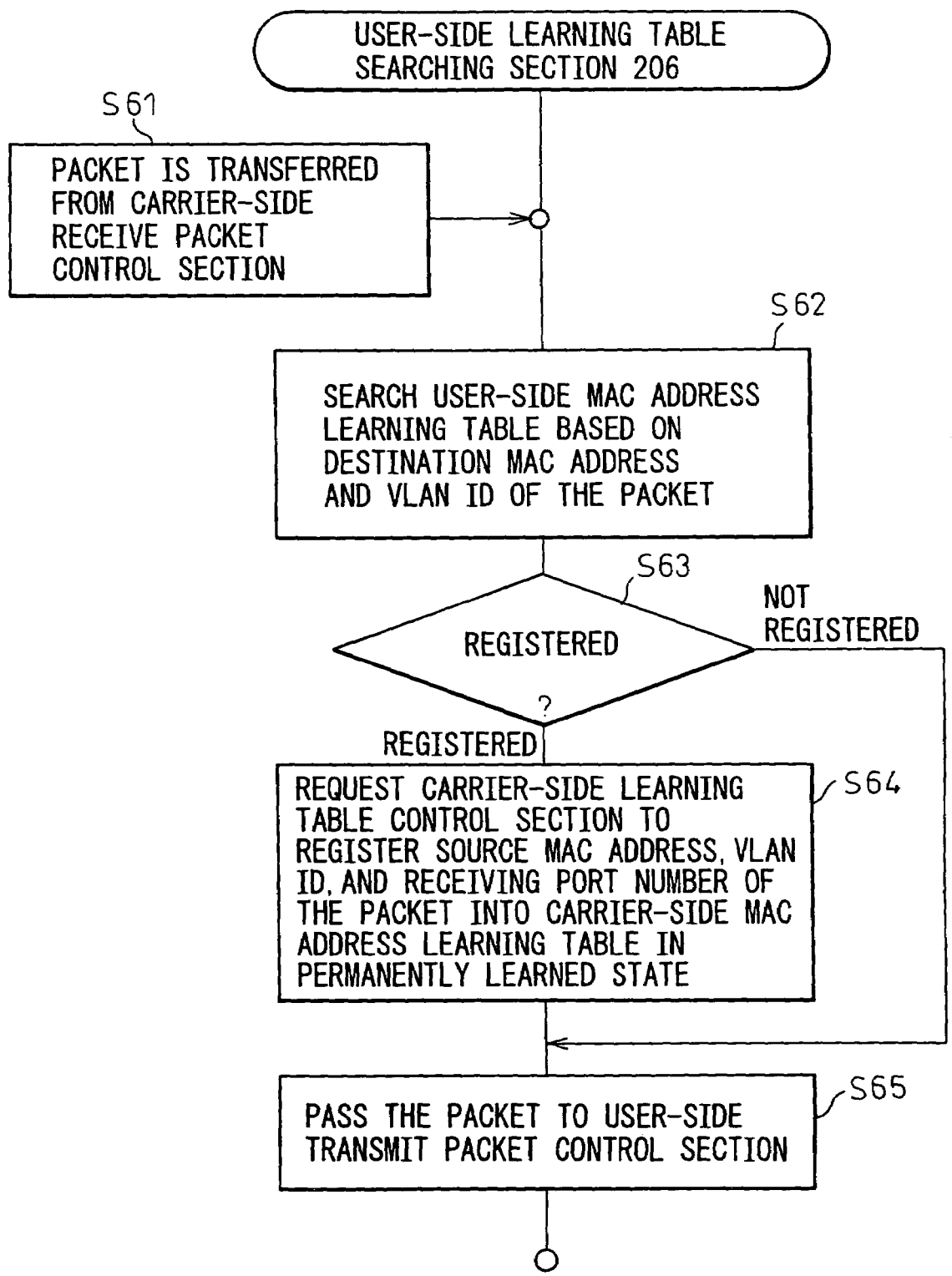
FIG. 6 is a flowchart for explaining an outline of the operation of a user-side learning table searching section 206.

FIG. 6 is a flowchart for explaining an outline of the operation of the user-side learning table searching section 206. In FIG. 6, the received packet is transferred from the carrier-side receive packet control section 205 in step S61. Next, in step S62, the carrier-side MAC address learning table 209 is searched based on the destination MAC address and VLAN ID of that packet.

Next, in step S63, it is checked to see whether or not the received packet is registered in the carrier-side MAC address learning table 209; if registered, the process proceeds to step S64, but if not registered, the process proceeds to step S65.

In step S64, a request is made to the carrier-side learning table control section 208 to register the source address, VLAN ID, and receiving port number of the received packet into the carrier-side MAC address learning table in a permanently learned state.

In step S65 after step S63 or S64, the packet is passed to the user-side transmit packet control section 207.

Figure 7:
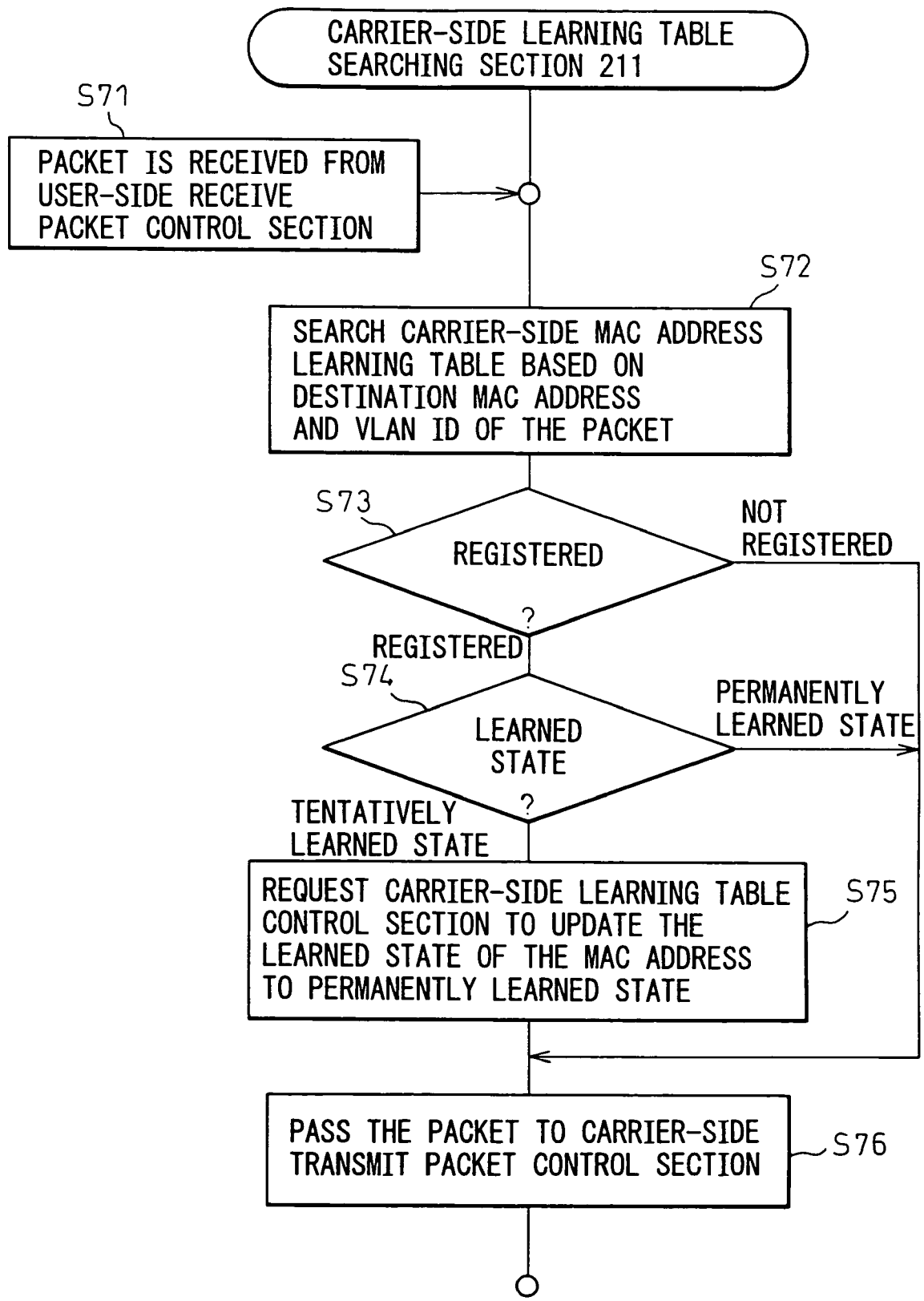
FIG. 7 is a flowchart for explaining an outline of the operation of a carrier-side learning table searching section 211.

FIG. 7 is a flowchart for explaining an outline of the operation of the carrier-side learning table searching section 211. In FIG. 7, a packet is received in step S71 from the user-side receive packet control section 210, and in step S72, the carrier-side MAC address learning table 209 is searched based on the destination MAC address and VLAN ID of the received packet; then in step S73, it is checked to see whether or not the packet is registered in the carrier-side MAC address learning table 209.

If the result of the checking in step S73 shows that the packet is registered, the process proceeds to step S74 to check the learned state of the packet. If the result of the checking shows that the learned state is the tentatively learned state, a request is made to the carrier-side learning table control section 208 to update the learned state of its MAC address to the permanently learned state. If not registered in step S73, or if the learned state checked in step S74 is the permanently learned state, or after performing step S75, the process proceeds to step S76 where the packet is passed to the carrier-side transmit packet control section 212.

Figure 8:
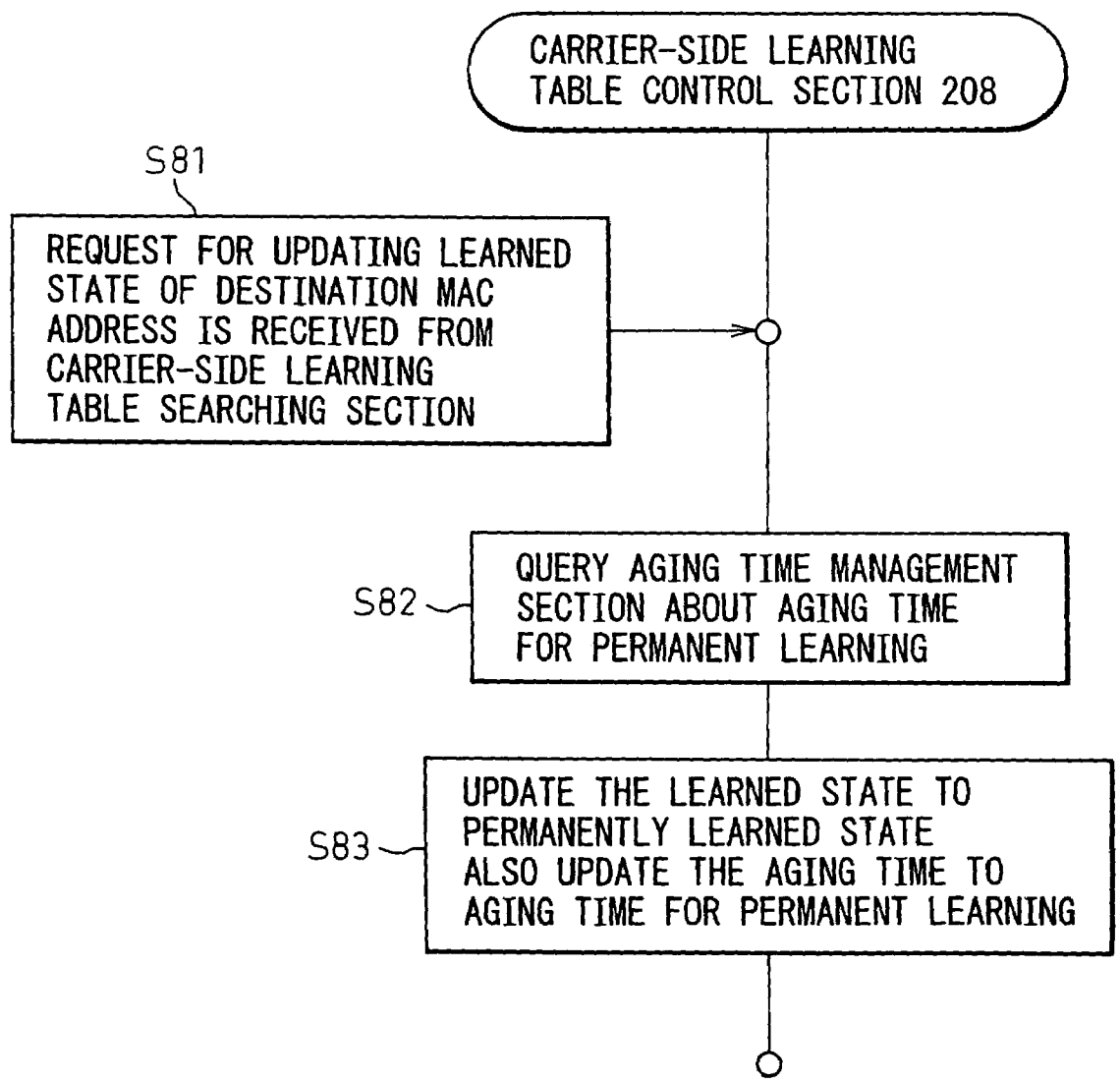
FIG. 8 is a flowchart for explaining an outline of the operation of the carrier-side learning table control section 208 when a packet is received from a user network.

FIG. 8 is a flowchart for explaining an outline of the operation of the carrier-side learning table control section 208 when a packet is received from the user network. In FIG. 8, a request for updating the learned state of the destination MAC address is received in step S81 from the carrier-side learning table searching section 211. This update request is issued only when the packet received from the user network is not learned yet or when its learned state in the carrier-side MAC address learning table 209 is the tentatively learned state. In other words, if the learned state of the packet received from the user network is the permanently learned state in the carrier-side MAC address learning table 209, neither the learned state nor the aging time is updated even when the update request is received.

Embodiment 1

Figure 9:
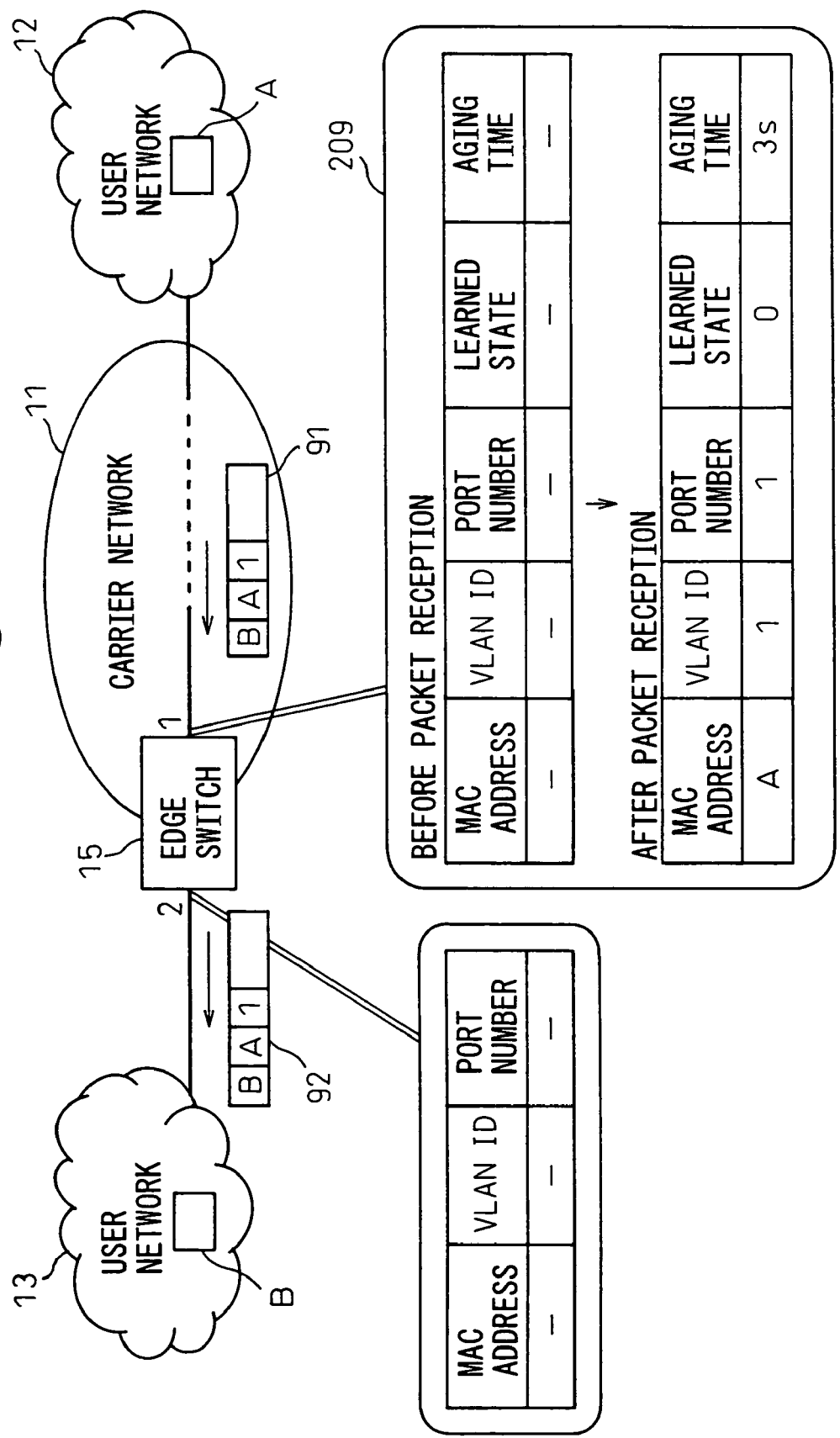
FIG. 9 is a diagram for explaining the operation according to a first embodiment of the present invention when a packet whose destination MAC address is yet to be learned is received from the carrier network.

FIG. 9 is a diagram for explaining the operation according to a first embodiment of the present invention when a packet whose destination MAC address is yet to be learned is received from the carrier network.

In the present embodiment, rather than automatically registering the source MAC address, VLAN ID, and receiving port number of the packet received from the carrier network 11 into the carrier-side MAC address learning table 209 as in the prior art, the edge switch 15 first checks whether or not the destination MAC address is registered in the carrier-side MAC address learning table 209 and, if not registered yet, the destination MAC address is registered temporarily as tentative learning into the carrier-side MAC address learning table 209.

The packet 91 transmitted from the terminal A in the user network 12 is a packet whose destination is B and source is A, and whose VLAN ID is 1. The carrier-side receive packet control section 205 in the edge switch 15 that received the packet 91 via the carrier network 11 requests the carrier-side learning table control section 208 to register the source MAC address, VLAN ID, and receiving port number of the packet into the carrier-side MAC address learning table 209, and passes the packet to the user-side learning table searching section 206. In the prior art, when making a request to the carrier-side learning table control section 208, the request was made to directly register the learned information, but in the present invention, the request is made to register it by ranking the learned state as tentative learning.

The carrier-side learning table control section 208, which was requested to register the learned information, searches the carrier-side MAC address learning table 209 based on the source MAC address and VLAN ID of the packet. Before the packet is received, its MAC address is not yet registered in the carrier-side MAC address learning table 209.

In the prior art, the source MAC address, VLAN ID, and receiving port number of the received packet were registered into the carrier-side MAC address learning table 209; then, a query was made to the aging time management section 213 about the aging time, and the aging time of fixed length was registered into the carrier-side MAC address learning table 209.

In contrast, in the first embodiment of the present invention, the aging time management section 213 manages the aging time according to the rank of the learned state, and when the packet is first received, the carrier-side learning table control section 208 queries the aging time management section 213 about the aging time for tentative learning. The aging time management section 213 returns the aging time for tentative learning to the carrier-side learning table control section 208 which then registers the learned state "0" indicating the tentatively learned state and 3-second aging time for tentative learning into the carrier-side MAC address learning table 209 in addition to the destination MAC address, VLAN ID, and port number.

Before updating the carrier-side MAC address learning table 209, the user-side learning table searching section 206 searches the carrier-side MAC address learning table 209 based on the destination MAC address and VLAN ID of the packet; here, as the destination MAC address is not learned yet, the user-side learning table searching section 206 passes the packet to the user-side transmit packet control section 207 by requesting it to broadcast the packet. The user-side transmit packet control section 207 that received the packet broadcasts the packet 92.

In this way, the edge switch 15 can check that the source MAC address of the packet first received from the carrier network 11 is not yet registered in the carrier-side MAC address learning table 209, and thus register the MAC address temporarily as tentative learning into the carrier-side MAC address learning table 209.

Embodiment 2

Figure 10:
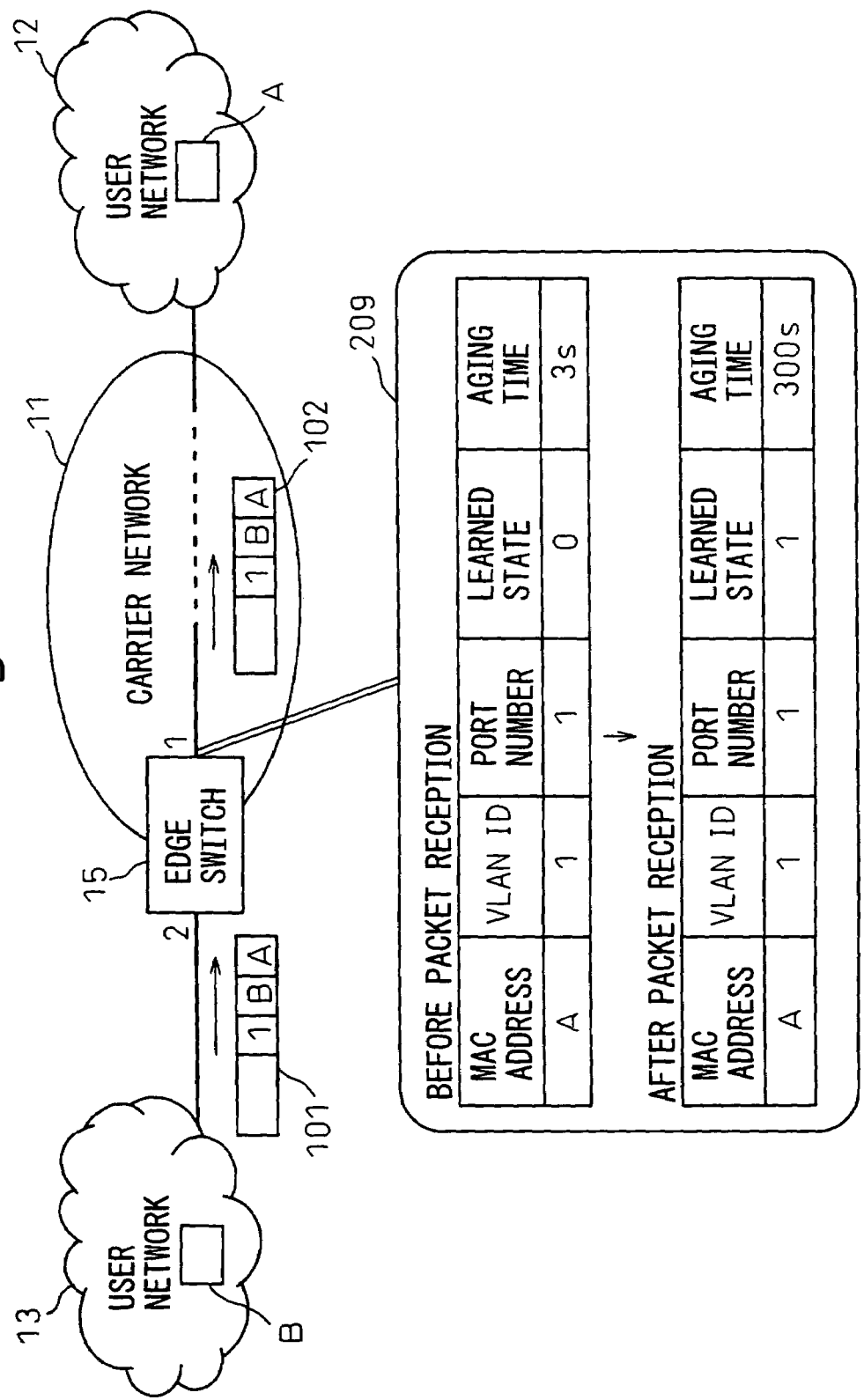
FIG. 10 is a diagram for explaining the operation according to a second embodiment of the present invention when a packet is received from the user network after the destination MAC address has been learned.

FIG. 10 is a diagram for explaining the operation according to a second embodiment of the present invention when a packet is received from the user network after the destination MAC address has been learned.

In the present embodiment, in the edge switch 15 the carrier-side MAC address learning table 209 is searched based on the destination MAC address and VLAN ID of the packet received from the user network 13, and the packet is transmitted to the carrier network 11 in accordance with the result of the search, as in the prior art; not only that, in the present embodiment, if the destination MAC address is registered as tentative learning in the carrier-side MAC address learning table 209, its learned state is updated to a valid learned state (permanently learned state).

The following description deals with the case where the edge switch 15 receives a packet from the terminal B when the carrier-side MAC address learning table 209 shown in FIG. 9 shows the condition after packet reception.

The packet 101 transmitted from the terminal B in the user network 13 is a packet whose destination is A and source is B, and whose VLAN ID is 1. The user-side receive packet control section 210 that received the packet 101 requests the user-side learning table control section 215 to register the source MAC address, VLAN ID, and receiving port number of the packet into the user-side MAC address learning table 214, and passes the packet to the carrier-side learning table searching section 211. The user-side learning table control section 215 registers the source MAC address, VLAN ID, and receiving port number of the packet into the user-side MAC address learning table 214.

In the prior art, the carrier-side learning table searching section 321 was configured to search the carrier-side MAC address learning table 317 based on the destination MAC address and VLAN ID of the packet, and pass the packet to the carrier-side transmit packet control section by requesting it to transmit the packet from the port 1 in accordance with the result of the search (FIG. 31).

By contrast, in the present invention, the carrier-side learning table searching section 211, when searching the carrier-side MAC address learning table 209, checks the learned state of the destination MAC address of the packet and, if the destination MAC address is learned in the form of a tentatively learned state, then makes a request to the carrier-side learning table control section 208 to update the learned state from the tentatively learned state to the valid learned state (permanently learned state).

The carrier-side learning table control section 208, which was requested to update the learned state, queries the aging time management section 213 about the aging time for permanent learning. The aging time management section 213, which manages the aging time according to the rank of the learned state, returns the aging time for permanent learning to the carrier-side learning table control section 208. The carrier-side learning table control section 208 updates the learned state to the permanently learned state for the packet registered in the carrier-side MAC address learning table 209, and also updates the aging time.

The carrier-side transmit packet control section 212 that received the packet from the carrier-side learning table searching section 211 transmits the packet 102 from the output port 204 in accordance with the result of the search conducted by the carrier-side learning table searching section 211.

In this way, the edge switch 15 can check that the destination MAC address of the packet received from the user network 13 is registered temporarily as tentative learning in the carrier-side MAC address learning table 209, and thus update the learned state to the valid learned state, i.e., the permanently learned state.

Embodiment 3

Figure 11:
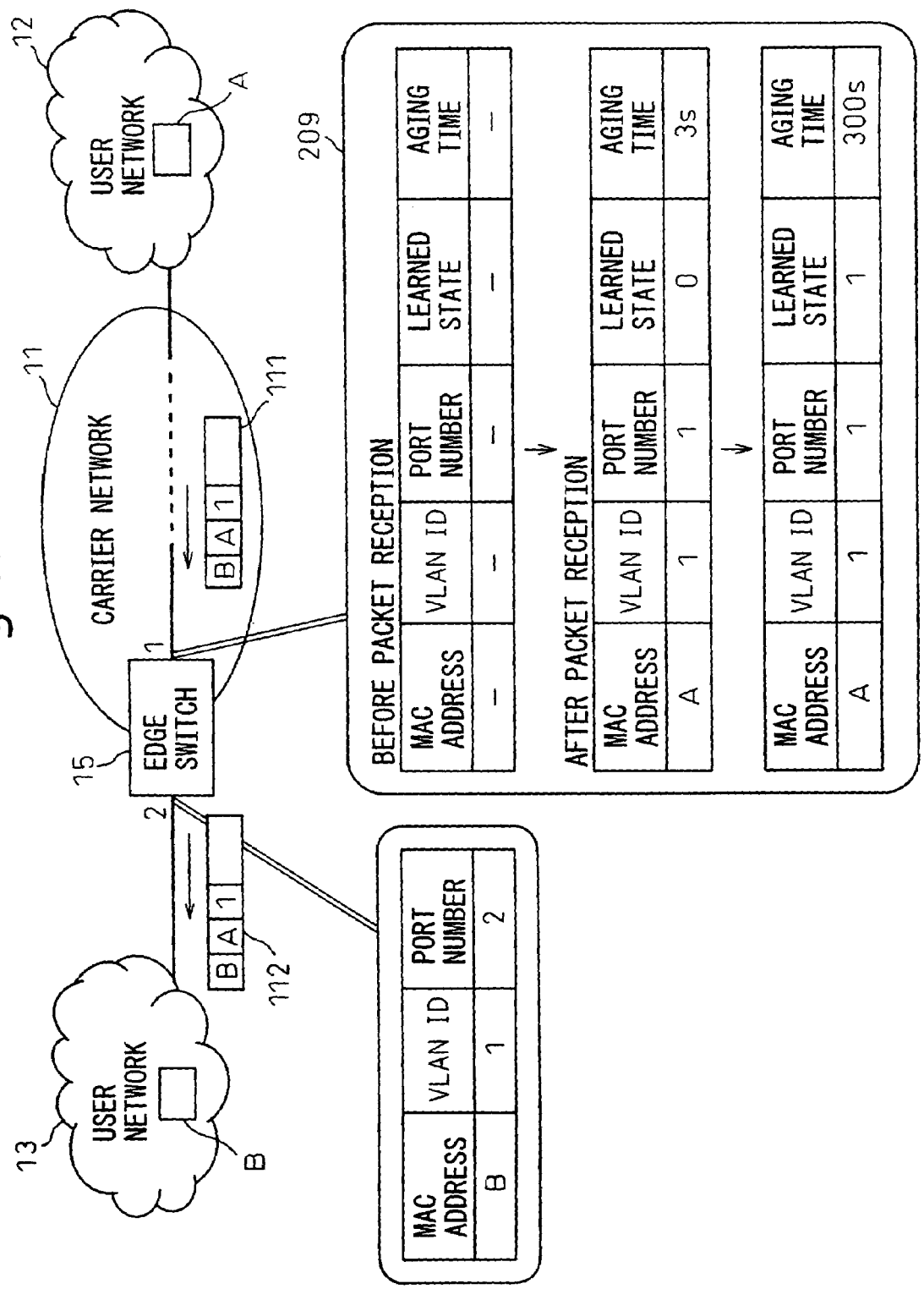
FIG. 11 is a diagram for explaining the operation according to a third embodiment of the present invention when a packet is received from the carrier network 11 after the destination MAC address has been learned.

FIG. 11 is a diagram for explaining the operation according to a third embodiment of the present invention when a packet is received from the carrier network 11 after the destination MAC address has been learned.

In the present embodiment, rather than automatically registering the source MAC address, VLAN ID, and receiving port number of the packet received from the carrier network 11 into the carrier-side MAC address learning table 209 as in the prior art, the edge switch 15 first checks that the destination MAC address of the received packet is registered in the user-side MAC address learning table 214, and registers the destination MAC address of the packet as valid learning into the carrier-side MAC address learning table 209.

The following description deals with the case where the packet from the terminal A is received at the edge switch 15 via the carrier network 11 after the destination MAC address of the packet received from the user network 13 has been learned as shown in FIG. 10.

The packet 111 transmitted from the terminal A is a packet whose source MAC address is A and destination MAC address is B, and whose VLAN ID is 1. The carrier-side receive packet control section 205 in the edge switch 15 that received the packet 111 requests the carrier-side learning table control section 208 to register the source MAC address, VLAN ID, and receiving port number of the packet into the carrier-side MAC address learning table 209, and passes the packet to the user-side learning table searching section 206.

In the prior art, when making a request to the carrier-side learning table control section 208, the request was made to directly register the learned information, but in the present invention, when a not-yet-learned packet is first received, the request is made to register it by ranking the learned state as tentative learning in the carrier-side MAC address learning table 209.

The carrier-side learning table control section 208, which was requested to register the learned information, searches the carrier-side MAC address learning table 209 based on the source MAC address and VLAN ID of the packet. Here, the source MAC address is not registered yet; therefore, in the prior art, a query was made to the aging time management section about the aging time, and the learned information and the aging time were directly registered into the carrier-side MAC address learning table.

By contrast, in the present embodiment, the aging time management section 213 manages the aging time according to the rank of the learned state, and the carrier-side learning table control section 208 makes a query about the aging time for tentative learning. The aging time management section 213 returns the aging time for tentative learning to the carrier-side learning table control section 208 which then registers the learned information, the learned state (tentative learning), and the aging time into the carrier-side MAC address learning table 209.

In the prior art, the user-side learning table searching section searched the user-side MAC address learning table based on the destination MAC address and VLAN ID of the packet and, as the MAC address was already learned, passed the packet to the user-side transmit packet control section by requesting it to transmit the packet from the designated output port.

In contrast, in the present embodiment, when the destination MAC address is already learned in the user-side MAC address learning table 214, the user-side learning table searching section 214 makes a request to the carrier-side learning table control section 208 to update the learned state of the source MAC address from the tentatively learned state to the valid learned state (permanently learned state) for the packet registered in the carrier-side MAC address learning table 209.

The carrier-side learning table control section 208, which was requested to update the learned state, queries the aging time management section 213 about the aging time for permanent learning. The aging time management section 213, which manages the aging time according to the rank of the learned state, returns the aging time for permanent learning to the carrier-side learning table control section 208. The carrier-side learning table control section 208 updates the learned state to the permanently learned state for the packet registered in the carrier-side MAC address learning table 209, and also updates the aging time.

The user-side transmit packet control section 207 that received the packet from the user-side learning table searching section 206 transmits the packet 112 from the output port 202 in accordance with the result of the search conducted by the user-side learning table searching section 206.

In this way, the edge switch 15 can check that the destination MAC address of the packet 111 received from the carrier network 11 is registered in the user-side MAC address learning table 214, and thus register the source MAC address of the packet as valid learning in the carrier-side MAC address learning table 209.

Embodiment 4

Figure 12:
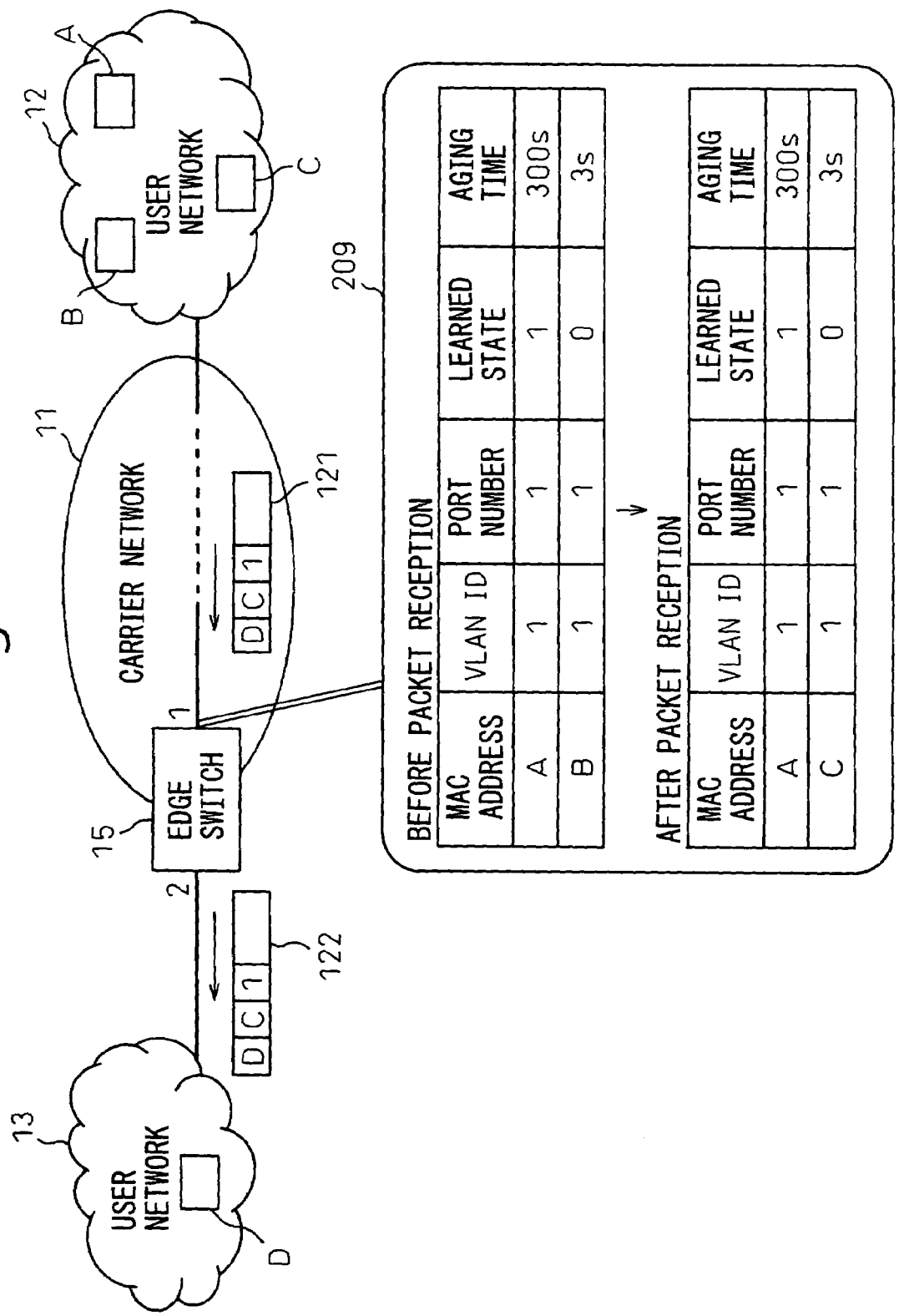
FIG. 12 is a diagram for explaining the operation according to a fourth embodiment of the present invention when a packet is received from the carrier network at a time that a carrier-side MAC address learning table 209 is saturated.

FIG. 12 is a diagram for explaining the operation according to a fourth embodiment of the present invention when a packet is received from the carrier network at a time that the carrier-side MAC address learning table 209 is saturated.

In the edge switch 15 of the present embodiment, when the registration of the learned information is requested at a time that the carrier-side MAC address learning table 209 is saturated, information registered in the tentatively learned state is preferentially selected for deletion, rather than deleting learned information irrespective of the learned contents as in the prior art; this serves to improve the hit rate in the carrier-side MAC address learning table 209.

In FIG. 12, the packet 121 transmitted from the terminal C in the user network 12 is a packet whose source MAC address is C and destination MAC address is D, and whose VLAN ID is 1. The carrier-side receive packet control section 205 in the edge switch 15 that received the packet 121 requests the carrier-side learning table control section 208 to register the source MAC address, VLAN ID, and receiving port number of the packet into the carrier-side MAC address learning table 209, and passes the packet to the user-side learning table searching section 206.

In the prior art, when making a request to the carrier-side learning table control section 208, the request was made to directly register the learned information, but in the present embodiment, as the packet from the terminal C is not learned yet, a request is made to register it by ranking its learned state as tentative learning.

The carrier-side learning table control section 208, which was requested to register the learned information, searches the carrier-side MAC address learning table 209 based on the source MAC address C and VLAN ID of the packet. As the source MAC address C is not yet registered in the carrier-side MAC address learning table 209 as shown in FIG. 12 before the reception of the packet C, the number of registered entries in the carrier-side MAC address learning table 209 is checked to determine whether the information of the packet C can be registered in the carrier-side MAC address learning table 209.

In the prior art, if the number of registered entries in the table was full, of the registered information entries, the oldest one was removed from the carrier-side MAC address learning table; then, a query was made to the aging management section about the aging time, and the learned information requested for registration and the aging time were registered directly into the carrier-side MAC address learning table.

In contrast, in the present embodiment, the carrier-side learning table control section 208 searches the carrier-side MAC address learning table 209 to retrieve learned information registered as tentative learning, and removes the thus retrieved learned information. Then, a query is made to the aging time management section 213 about the aging time for tentative learning. The aging time management section 213 returns the aging time for tentative learning to the carrier-side learning table control section 208 which then registers the learned information, the learned state (tentative learning), and the aging time into the carrier-side MAC address learning table 209.

In this way, in the edge switch 15, the requested learned information is registered by deleting the learned information registered in the tentatively learned state in the carrier-side MAC address learning table 209; this serves to improve the hit rate in the learning table.

Figure 13:
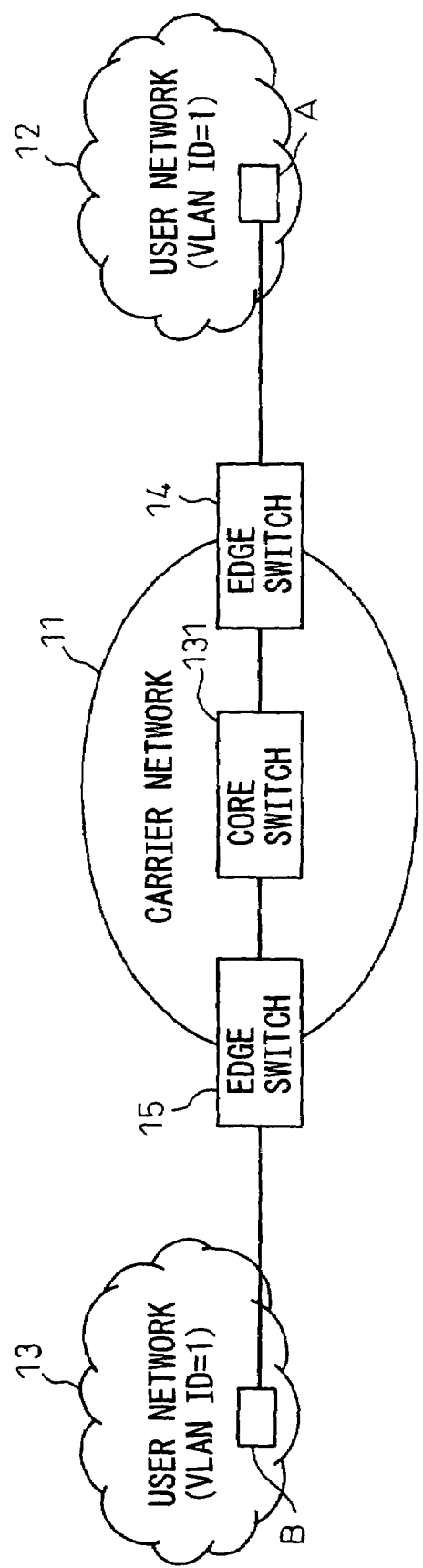
FIG. 13 is a diagram showing an example of the network configuration applied to each of the above embodiments.

FIG. 13 is a diagram showing an example of the network configuration applied to each of the above embodiments. For simplicity of explanation, the network will be described for the case where EoE technology is not used, but it will be recognized that the present invention can also be applied without any problem in the case where EoE technology is used. The network configuration shown in FIG. 13 is substantially the same as that shown in FIG. 1. In FIG. 13, a core switch 131 is interposed between the edge switches 14 and 15, while the terminal A is located in the user network 12 and the terminal B in the user network 13.

The aging time in each of the edge switches 14 and 15 is configurable by a command input or the like; in each embodiment of the present invention, the aging time is initially set to 3 seconds for tentative learning and 300 seconds for permanent learning. Of course, the aging times for tentative learning and permanent learning, respectively, may be set to times other than the above.

Figure 14:
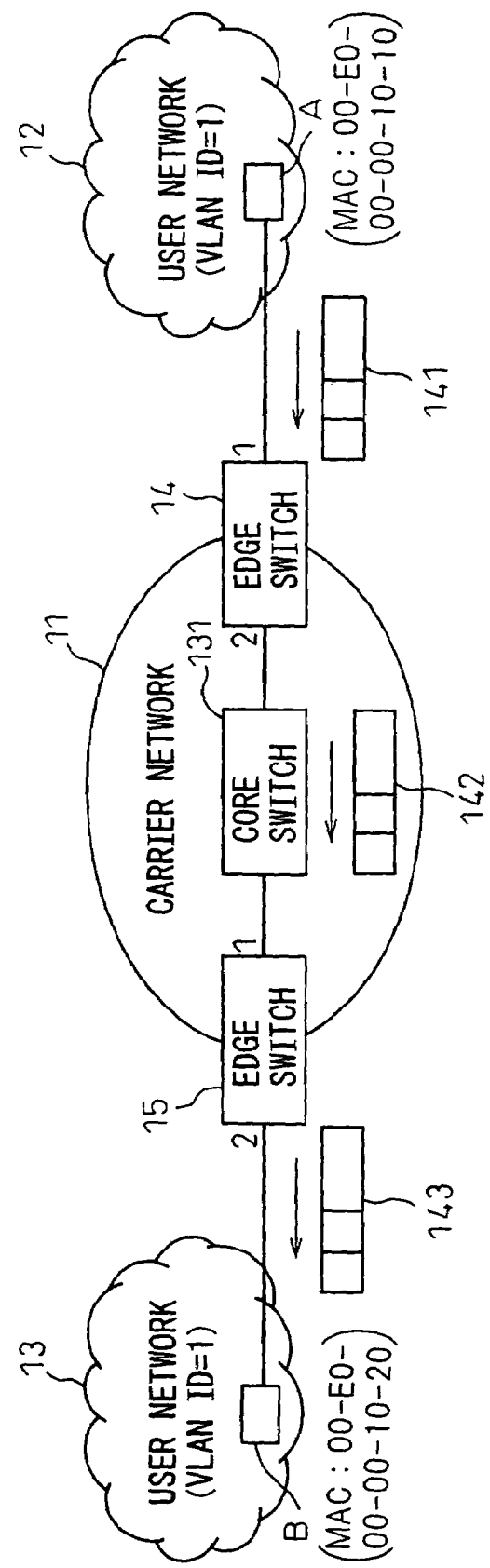
FIG. 14 is a diagram for explaining a specific example of packet transmission from a terminal A to a terminal B in each of the above embodiments.

FIG. 14 is a diagram for explaining a specific example of packet transmission from the terminal A to the terminal B in each of the above embodiments.

In the example shown in FIG. 14, the MAC address of the terminal A is 00-E0-00-00-10-10, the MAC address of the terminal B is 00-E0-00-00-10-20, and VLAN ID=1 is registered for the port 1 and port 2 of the edge switches 14 and 15.

The packet 141 transmitted from the terminal A is received on the port 1 of the edge switch 14. The user-side receive packet control section 210 in the edge switch 14 requests the user-side learning table control section 215 to register the source MAC address=00-E0-00-00-10-10, VLAN ID=1, and receiving port number=1 of the packet into the user-side MAC address learning table 214, and passes the packet to the carrier-side learning table searching section 211.

The user-side learning table control section 215 registers the source MAC address, VLAN ID, and receiving port number of the packet into the user-side MAC address learning table 214. FIG. 16 is a diagram showing, by way of example, the contents of the user-side MAC address learning table 214 in the edge switch 14.

The carrier-side learning table searching section 211 searches the carrier-side MAC address learning table 209 based on the destination MAC address=00-E0-00-00-10-20 and VLAN ID=1 of the packet 141; here, as the MAC address is not learned yet, the packet 141 is passed to the carrier-side transmit packet control section 212 by requesting it to broadcast the packet 141. The carrier-side transmit packet control section 212 that received the packet 141 broadcasts the packet to the port 2 where VLAN ID=1 is registered.

The packet 142 broadcast from the port 2 of the edge switch 14 is received by the core switch 131 and transferred to the edge switch 15. The operation of the core switch 131 at this time is the same as that in the prior art, and the description thereof will not be repeated in this embodiment.

The packet 142 transferred from the core switch 131 is received on the port 1 of the edge switch 15. As previously shown in the flowchart of FIG. 4, the carrier-side receive packet control section 205 in the edge switch 15 requests the carrier-side learning table control section 208 to register the source MAC address=00-E0-00-00-10-10, VLAN ID=1, and receiving port number=1 of the packet 142 into the carrier-side MAC address learning table 209, and passes the packet 142 to the user-side learning table searching section 206. In the present invention, when requesting the registration of the learned information not yet learned in the carrier-side MAC address learning table 209, the request is made to register it in a tentatively learned state.

The carrier-side learning table control section 208 searches the carrier-side MAC address learning table 209 based on the source MAC address and VLAN ID of the packet, and checks the learned state of the MAC address, as previously shown in the flowchart of FIG. 4. As the MAC address is not learned yet, a query is made to the aging time managing section 213 about the aging time for tentative learning.

FIG. 17 is a diagram showing, by way of example, the contents of the aging time management table maintained in the aging time managing section 213.

Based on the learned state=tentative learning, the aging time management section 213 retrieves the aging time from the aging time management table shown in FIG. 17, and returns the aging time=3 seconds to the carrier-side learning table control section 208, as previously shown in the flowchart of FIG. 5. The carrier-side learning table control section 208 registers the source MAC address, VLAN ID, and receiving port number of the packet 142 into the carrier-side MAC address learning table 209 together with the learned state=0 (tentative learning) and aging time=3 seconds.

FIG. 18 is a diagram showing the contents of the carrier-side MAC address learning table 209 in the edge switch 15 in which the tentatively learned information has been registered.

The user-side learning table searching section 206 in the edge switch 15 searches the user-side MAC address learning table 214 based on the destination MAC address=00-E0-00-00-10-20 and VLAN ID=1 of the packet, as previously shown in the flowchart of FIG. 6; here, as the destination MAC address is not learned yet, the packet 143 is passed to the user-side transmit packet control section 207 by requesting it to broadcast the packet 143. The user-side transmit packet control section 207 that received the packet 143 broadcasts the packet 143 to the port 2 where VLAN ID=1 is registered.

As described above, when the source MAC address, VLAN ID, and receiving port of the packet are not learned yet in the edge switch 15, these pieces of information are registered as tentative learning into the MAC address learning table.

Figure 15:
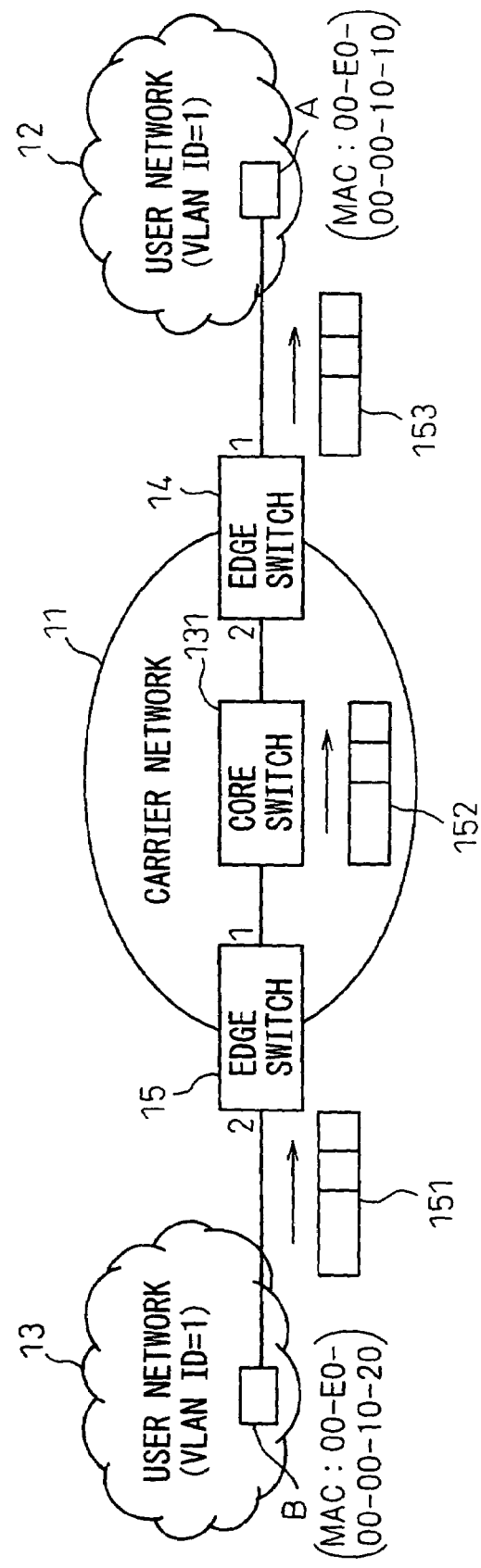
FIG. 15 is a diagram for explaining, by way of specific example, the operation of packet transmission from the terminal B to the terminal A in each of the above embodiments.

FIG. 15 is a diagram for explaining, by way of specific example, the operation of packet transmission from the terminal B to the terminal A in each of the above embodiments.

For simplicity of explanation, the following description is given on the assumption that the operation explained with reference to FIG. 14 is just completed. The MAC address=00-E0-00-00-10-10 of the terminal A is already learned in both the user-side MAC address learning table 214 in the edge switch 14 and the carrier-side MAC address learning table 209 in the edge switch 15.

The packet 151 transmitted from the terminal B shown in FIG. 15 is received on the port 2 of the edge switch 15. The user-side receive packet control section 210 in the edge switch 15 requests the user-side learning table control section 215 to register the source MAC address=00-E0-00-00-10-20, VLAN ID=1, and receiving port number=2 of the packet into the user-side MAC address learning table 214, and passes the packet to the carrier-side learning table searching section 211.

The user-side learning table control section 215 registers the source MAC address, VLAN ID, and receiving port number of the packet into the user-side MAC address learning table 214.

FIG. 19 is a diagram showing the contents of the user-side MAC address learning table 214 in the edge switch 15 of FIG. 15 after the above registration has been made.

The carrier-side learning table 211 searches the carrier-side MAC address learning table 209 based on the destination MAC address=00-E0-00-00-10-10 and VLAN ID=1 of the packet, as previously shown in FIG. 7. As the destination MAC address is registered in the tentatively learned state as shown in FIG. 18, the carrier-side learning table searching section 211 requests the carrier-side learning table control section 208 to update the learned state of the destination MAC address from the tentatively learned state to the permanently learned state. Further, a request is made to the carrier-side transmit packet control section 212 to transmit the packet from the port 1, and the packet is passed to it.

The carrier-side learning table control section 208 queries the aging time management section 213 about the aging time for permanent learning, as previously shown in the flowchart of FIG. 8. Based on the learned state=permanent learning, the aging time management section 213 retrieves the aging time from the aging time management table shown in FIG. 7, and returns the aging time=300 seconds to the carrier-side learning table control section 208, as previously shown in the flowchart of FIG. 5. The carrier-side learning table control section 208 updates the learned state in the carrier-side MAC address learning table 209 to 1 (permanent learning), and also updates the aging time to 300 s (seconds). FIG. 20 is a diagram showing the carrier-side MAC address learning table 209 after the updating.

The carrier-side transmit packet control section 212 that received the packet from the carrier-side learning table 211 transmits the packet 152 from the port 1 toward the core switch 131 in the carrier network 11 in accordance with the result of the search of the carrier-side learning table searching section 211.

As described above, in the edge switch 15, when the packet directed toward the carrier network 11 is received from the user network 13, the tentatively learned state can be updated to the permanently learned state.

The packet 152 transmitted from the port 1 of the edge switch 15 is received at the core switch 131 and transferred to the edge switch 14. The operation of the core switch 131 at this time is the same as that in the prior art, and the description thereof will not be repeated here.

The packet 152 transferred from the core switch 131 is received on the port 2 of the edge switch 14. As previously shown in the flowchart of FIG. 4, the carrier-side receive packet control section 205 in the edge switch 14 requests the carrier-side learning table control section 208 to register the source MAC address=00-E0-00-00-10-20, VLAN ID=1, and receiving port number=2 of the packet into the carrier-side MAC address learning table 209 in the tentatively learned state, and passes the packet to the user-side learning table 206.

The carrier-side learning table control section 208 searches the carrier-side MAC address learning table 209 based on the source MAC address and VLAN ID of the packet 153, and checks the learned state of the source MAC address, as previously shown in the flowchart of FIG. 4. In this case, since the source MAC address is not learned yet, a query is made to the aging time managing section 213 about the aging time for tentative learning.

Based on the learned state=tentative learning, the aging time management section 213 retrieves the aging time from the aging time management table shown in FIG. 17, and returns the aging time=3 s to the carrier-side learning table control section 208, as previously shown in the flowchart of FIG. 5. The carrier-side learning table control section 208 registers the source MAC address, VLAN ID, and receiving port number of the packet into the carrier-side MAC address learning table 209 together with the learned state=0 (tentative learning) and aging time=3 s. FIG. 21 is a diagram showing the contents of the carrier-side MAC address learning table 209 after the above tentative learning registration has been made.

The user-side learning table searching section 206 searches the user-side MAC address learning table 214 based on the destination MAC address=00-E0-00-00-10-10 and VLAN ID=1 of the packet, as previously shown in the flowchart of FIG. 6. In this case, as the destination MAC address is already learned as shown in FIG. 16, the user-side learning table searching section 206 requests the carrier-side learning table control section 208 to register the source MAC address=00-E0-00-00-10-20, VLAN ID=1, and receiving port number=2 of the packet in the permanently learned state. Further, a request is made to the user-side transmit packet control section 207 to transmit the packet from the port 1, and the packet is passed to it.

The carrier-side learning table control section 208 searches the carrier-side MAC address learning table 209 based on the source MAC address and VLAN ID of the packet, and checks the learned state of the source MAC address, as previously shown in the flowchart of FIG. 4. In this case, as the source MAC address is in the tentatively learned state (learned state=0) as shown in FIG. 21, a query is made to the aging time managing section 213 about the aging time for permanent learning.

Based on the learned state=permanent learning, the aging time management section 213 retrieves the aging time from the aging time management table shown in FIG. 17, and returns the aging time=300 s to the carrier-side learning table control section 208, as previously shown in the flowchart of FIG. 4. The carrier-side learning table control section 208 updates the learned state to 1 (permanent learning), and also updates the aging time to 300 s, as shown in FIG. 22. FIG. 22 is a diagram showing the contents of the carrier-side MAC address learning table 209 in the edge switch 14 after updating the learned state to the permanently learned state.

The user-side transmit packet control section 207 that received the packet from the user-side learning table searching section 206 transmits the packet from the port 1 toward the terminal A in the user network 12 in accordance with the result of the search conducted by the user-side learning table searching section 206.

As described above, in the edge switch 14, when the packet directed toward the user network 12 is received from the carrier network 11, the tentatively learned state can be updated to the permanently learned state.

Further, the timeout period can be set according to the rank of the learned information registered in the carrier-side MAC address learning table 209.

Thereafter, the edges switches 14 and 15 in the carrier network 11 can transfer packets between the terminals A and B in accordance with the respective MAC address learning tables, without having to transmit broadcast packets.

As described above, the learned information can be ranked and held in each edge switch of the carrier network 11.

In this condition, the aging time management section 213 in each edge switch counts down the aging time at one-second intervals for each piece of learned information in the carrier-side MAC address learning table 209, as in the prior art, and removes the learned information from the carrier-side MAC address learning table 209 when its aging time has been counted down to 0s (second). As different aging times are set for the different learned states, information registered in the tentatively learned state can be deleted earlier than information registered in the permanently learned state; this serves to prevent the MAC address learning table from becoming saturated with unnecessary learning.

Mode 2

Figure 23:
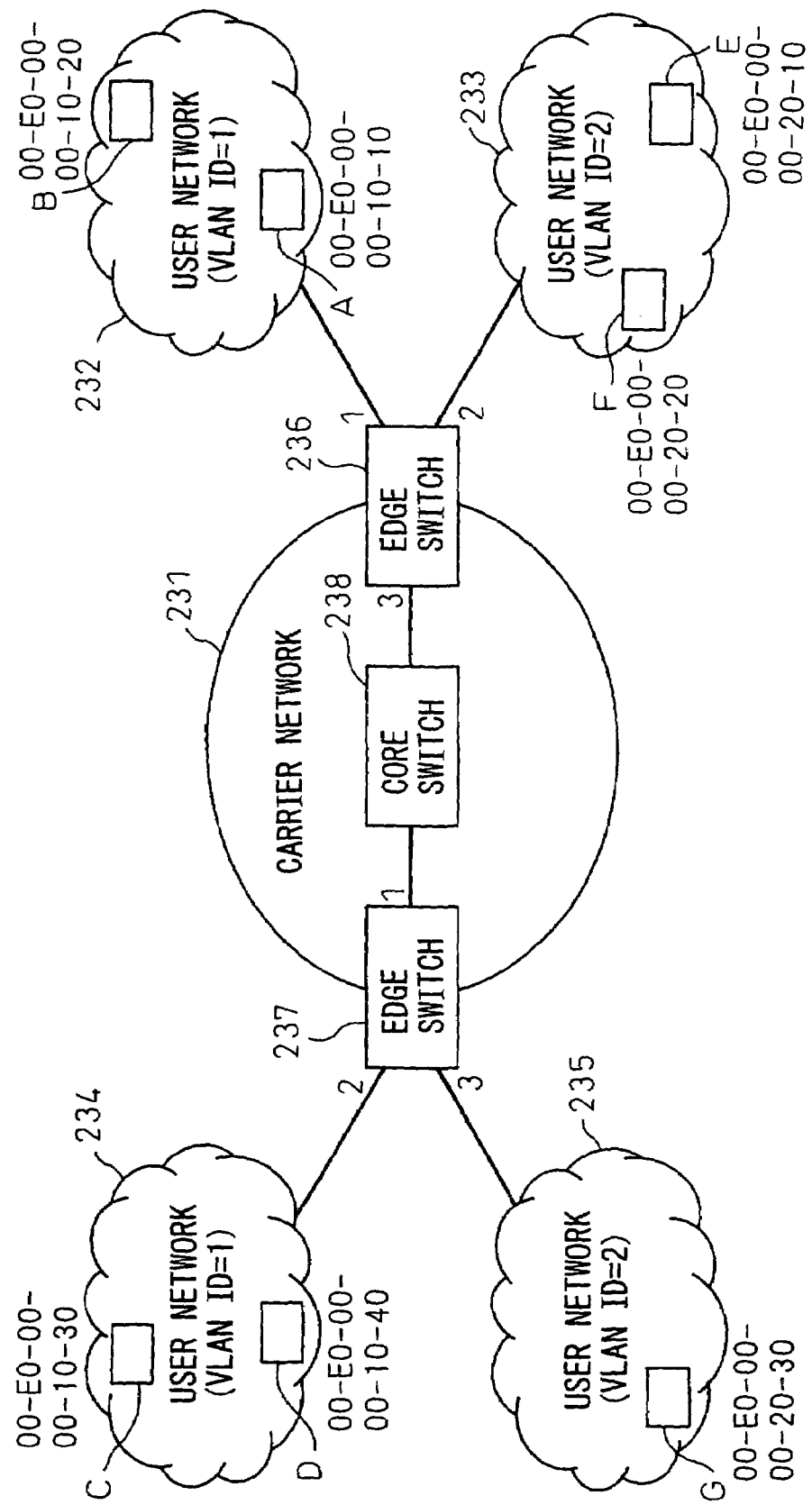
FIG. 23 is a diagram for explaining an outline of a MAC address learning apparatus according to a second mode of the present invention.

FIG. 23 is a diagram for explaining an outline of a MAC address learning apparatus according to a second mode of the present invention.

For simplicity of explanation, the second mode of the invention also will be described for the case where EoE technology is not used, but it will be recognized that the second mode can also be applied without any problem to the case where EoE technology is used.

As shown, in a network providing a wide-area LAN service which allows communications to be performed between user networks 232 to 235 via a carrier network 231, the carrier network 231 to which the MAC address learning apparatus is applied comprises an edge switch 236 connected to the user networks 232 and 233, an edge switch 237 connected to the user networks 234 and 235, and a core switch 238 connected between the edges switches 236 and 237.

In the second mode also, the configuration of each of the edge switches 236 and 237 is the same as that shown in FIG. 2, and descriptions of the same parts as those explained in the first mode will not be repeated here.

In the illustrated example, VLAN ID=1 is assigned to the user networks 232 and 234, while VLAN ID=2 is assigned to the user networks 233 and 235. The user network 232 contains terminals A and B, the user network 234 contains terminals C and D, the user network 233 contains terminals E and F, and the user network 235 contains a terminal G.

The MAC addresses of the terminals A to D in the user networks 232 and 234 of VLAN ID=1 are 00-E0-00-00-10-10, 00-E0-00-00-10-20, 00-E0-00-00-10-30, and 00-E0-00-00-10-40, respectively. On the other hand, the MAC addresses of the terminals E to G in the user networks 233 and 235 of VLAN ID=2 are 00-E0-00-00-20-10, 00-E0-00-00-20-20, and 00-E0-00-00-20-30, respectively.

FIG. 24 is a diagram showing the contents of the carrier-side MAC address learning table 209 in the edge switch 237 according to the second mode of the invention, where the maximum number of registration entries in the table is three. In the figure, in common with the first mode, the aging time is 300 s (seconds) when the learned state is 1 (permanent learning) and 3 s (seconds) when it is 0 (tentative learning). The maximum number of registration entries shown here as being three is for illustrative purposes only; in practice, the maximum number of registration entries in the table is much larger.

FIG. 25 is a diagram showing the updated contents of the carrier-side MAC address learning table 209 according to the second mode of the invention when the condition for deletion of tentatively learned information from the carrier-side MAC address learning table 209 is set so that tentatively learned information is deleted by searching in ascending order of table entries. FIG. 26 is a diagram showing the undated contents of the carrier-side MAC address learning table 209 according to the second mode of the invention when the condition for the deletion of tentatively learned information from the carrier-side MAC address learning table 209 is set so that tentatively learned information is deleted by searching based on the VLAN ID.

Figure 27:
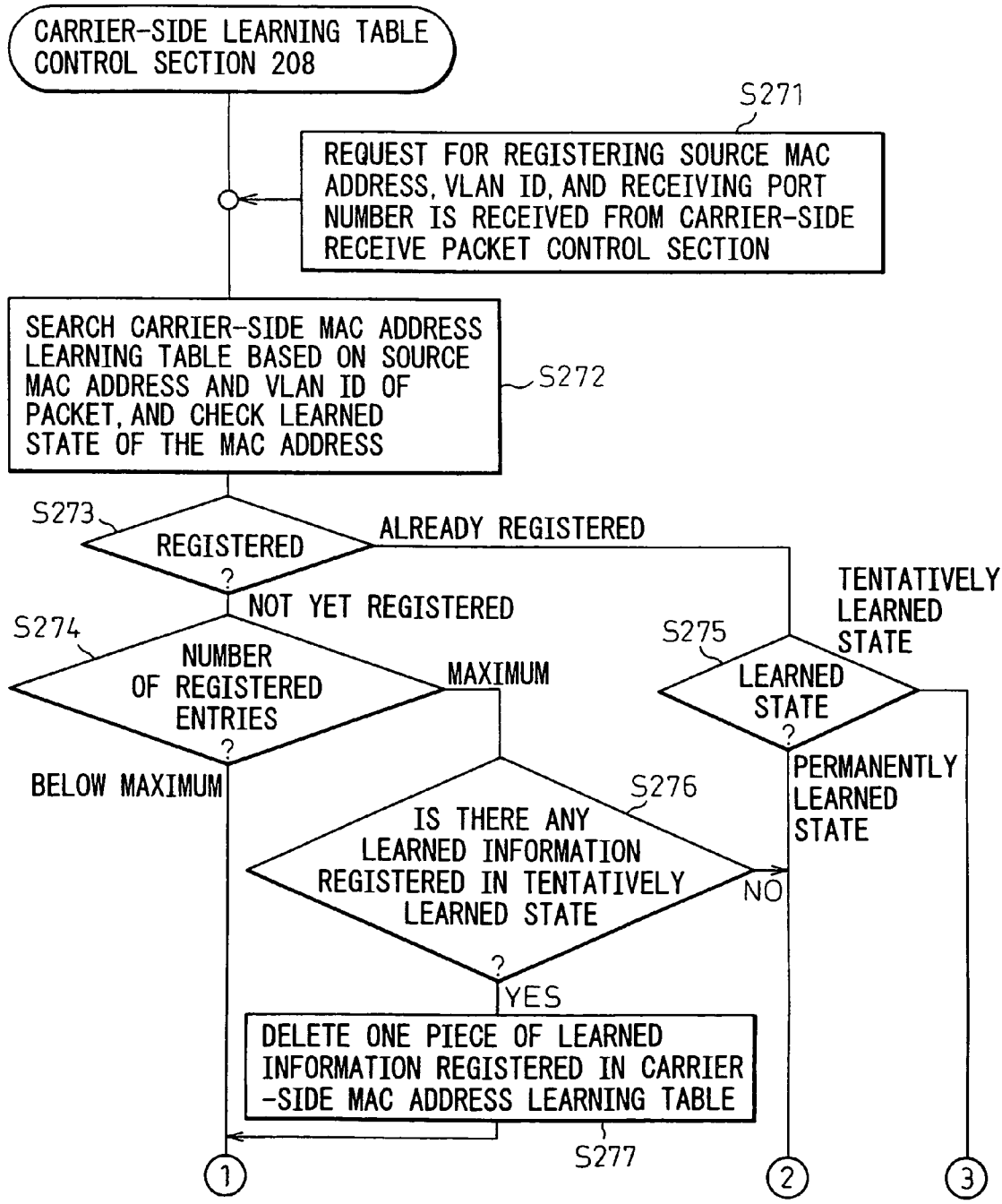
FIG. 27 is a part of a flowchart for explaining the operation of the carrier-side learning table control section 208 according to the second mode of the present invention.
Figure 28:
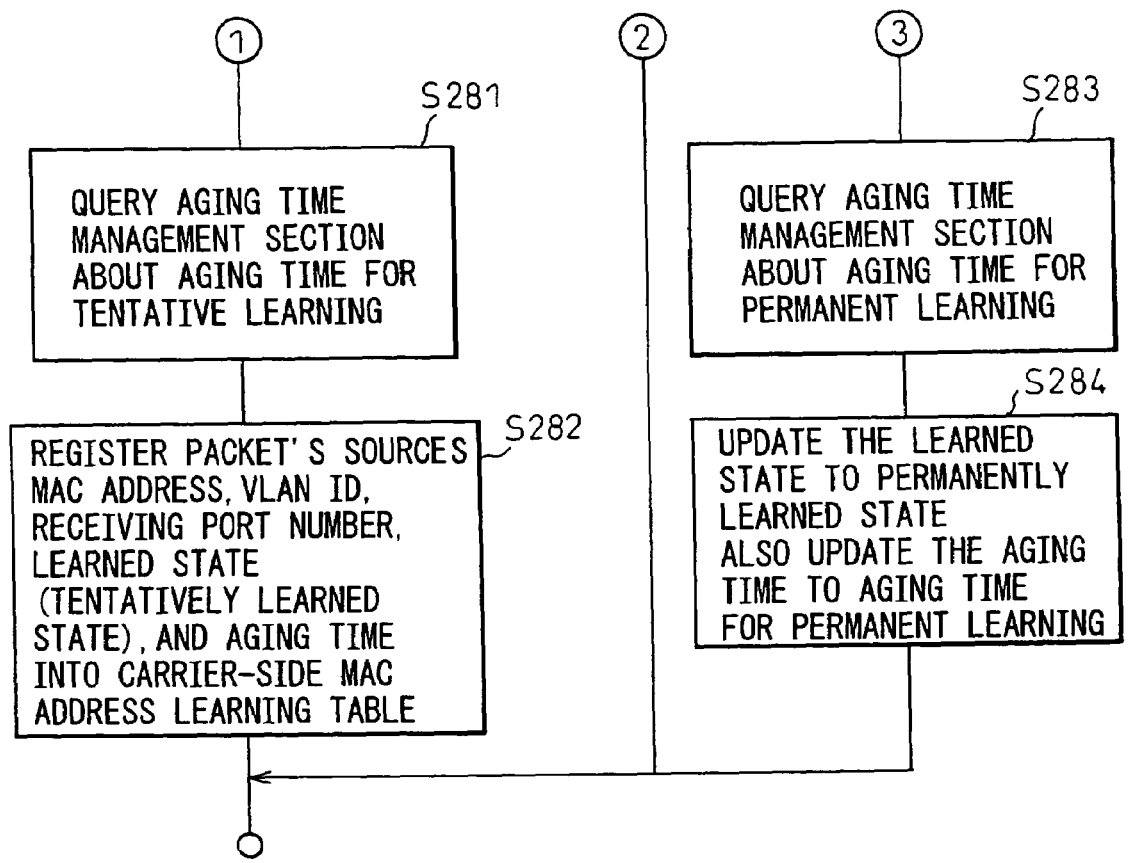
FIG. 28 is the remaining part a flowchart for explaining the operation of the carrier-side learning table control section 208 according to the second mode of the present invention.
Figure 29:
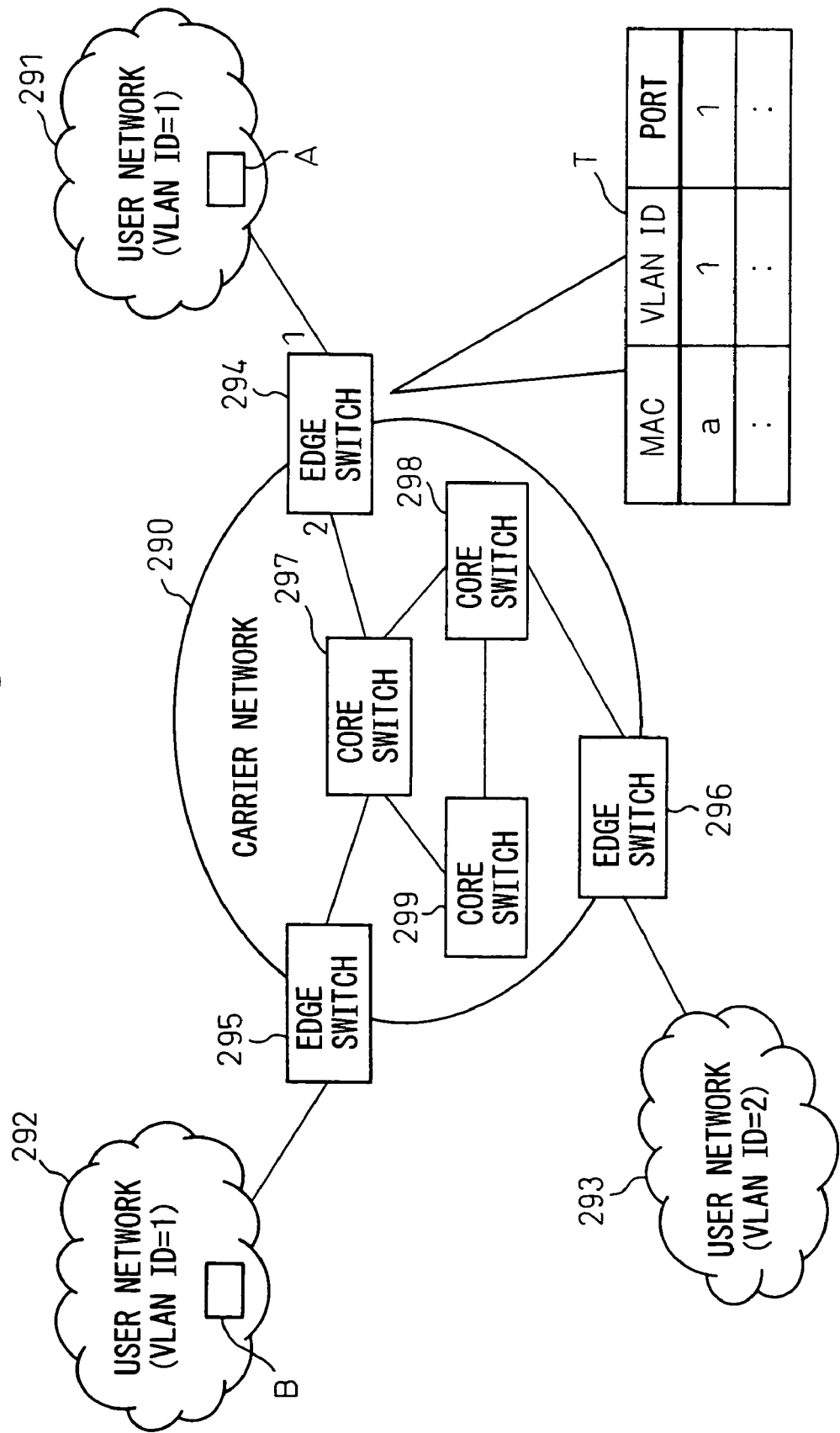
FIG. 29 is a schematic diagram for explaining a MAC address learning method according to the prior art.
Figure 30:
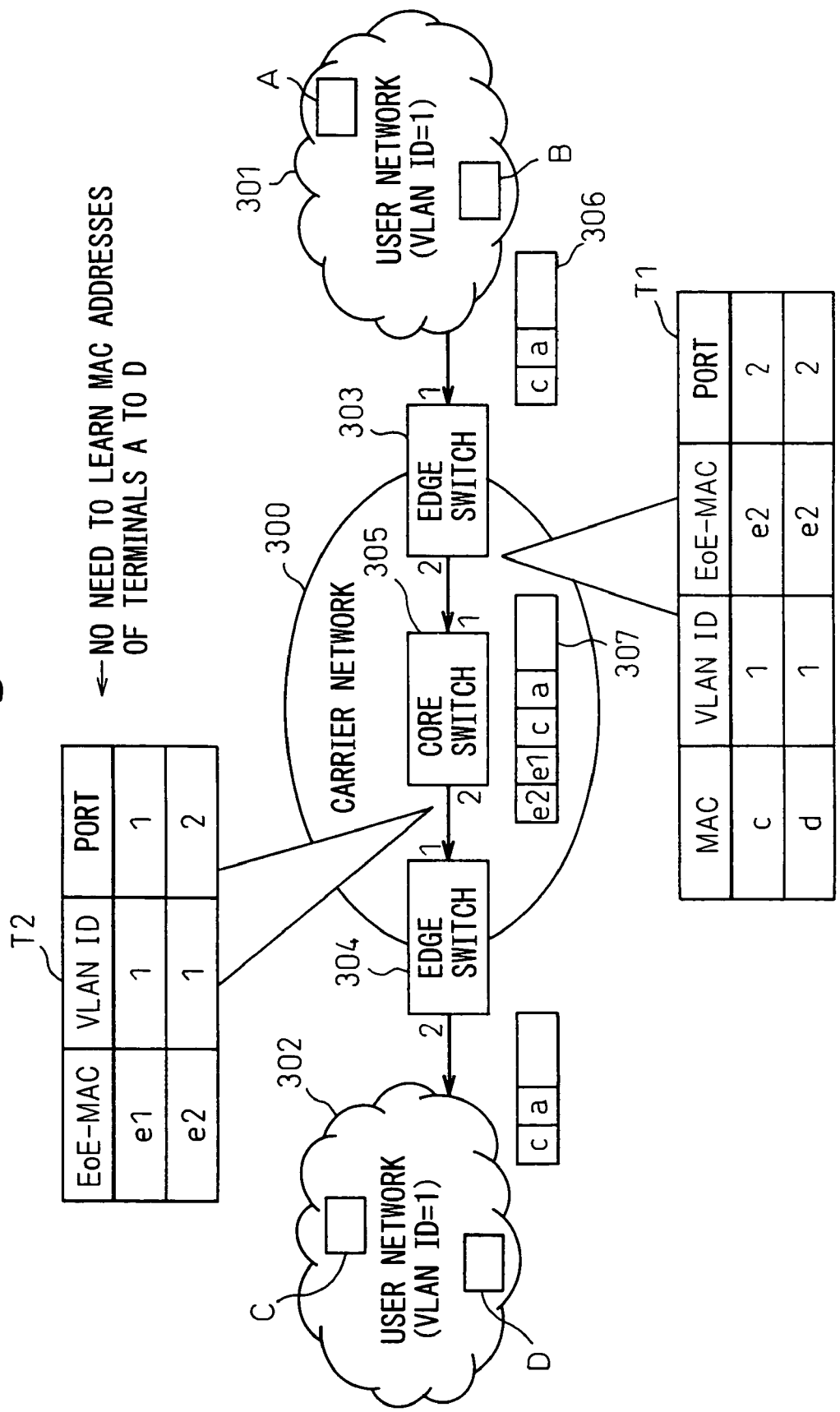
FIG. 30 is a schematic diagram for explaining packet transmission and reception when prior art EoE technology is used.

FIGS. 27 and 28 are a flowchart for explaining the operation of the carrier-side learning table control section 208 according to the second mode of the invention.

The operation of the MAC address learning apparatus according to the second mode of the invention will be described below with reference to FIGS. 23 to 28 in conjunction of FIG. 2.

The following description deals with the case where packets are transferred between the terminal E having VLAN ID=2 and the terminal G having the same VLAN ID=2.

The packet transmitted from the terminal E in the user network 233 is transferred through the carrier network 231 and received at the edge switch 237. The operation of the edge switch 236 as well as that of the core switch 238 at this time is the same as that described in the first mode, and the description thereof will not be repeated here.

The packet transferred from the core switch 238 is received on the port 1 of the edge switch 237. The carrier-side receive packet control section 205 in the edge switch 237 requests the carrier-side learning table control section 208 to register the source MAC address=00-E0-00-00-20-10, VLAN ID=2, and receiving port number=1 of the packet into the carrier-side MAC address learning table 209, and passes the packet to the user-side learning table searching section 206. In the second mode also, when first making a request to register the learned information into the carrier-side MAC address learning table 209, the request is made to register it in a tentatively learned state.

The carrier-side learning table control section 208, based on the source MAC address and VLAN ID of the packet, searches the carrier-side MAC address learning table 209, and checks the learned state of the source MAC address, as shown in the flowchart of FIGS. 27 and 28. At first, as the learned state of the source MAC address is 0 (not yet learned) as shown in FIG. 24, the number of registered information entries in the table is checked (step S274). Here, the learned information is already registered up to the maximum number in the carrier-side MAC address learning table 209, as shown in FIG. 24; therefore, the carrier-side MAC address learning table 209 is searched for any information registered in the tentatively learned state, and the learned information of the MAC address=00-E0-00-00-10-10, whose learned state is tentative learning, is deleted. The remainder of the process up to the step of registering the learned information of the MAC address=00-E0-00-00-20-10 is the same as that in the first mode, and therefore will not be described here.

In the second mode, the carrier-side MAC address learning table 209 is searched in ascending order of table entries and, of the information registered in the tentatively learned state, the first found information is removed from the table; alternatively, provisions may be made to delete the learned information whose VLAN ID value matches that of the learned information (MAC address=00-E0-00-00-20-10, VLAN ID=2, receiving port number=1) about to be registered. In the latter case, the learned information of the MAC address=00-E0-00-00-20-20 is deleted, since its VLAN ID value matches VLAN ID=2.

When the condition for deletion of tentatively learned information from the carrier-side MAC address learning table 209 is set so that tentatively learned information is deleted by searching in ascending order of table entries, the contents of the carrier-side MAC address learning table 209 after updating is as shown in FIG. 25. On the other hand, when the condition for deletion of tentatively learned information from the carrier-side MAC address learning table 209 is set so that tentatively learned information is deleted by searching based on the VLAN ID, the contents of the carrier-side MAC address learning table 209 after updating is as shown in FIG. 26.

As described above, in the edge switch 237 according to the second mode, as the requested learned information is registered by deleting the learned information registered in the tentatively learned state in the carrier-side MAC address learning table 209, the hit rate in the learning table can be increased.

According to the present invention, in a MAC address learning apparatus that is used in data transmission equipment intended for use by communications carriers who provide wide-area VLAN, or like, services, any learned information is temporarily held in the MAC address learning table as tentatively learned information until the information is determined to be valid learned information; this serves to prevent the MAC address learning table from becoming saturated with unnecessary learning. Furthermore, even if the MAC address learning table is saturated, the hit rate in the MAC address learning table can be improved by preferentially removing the tentatively learned information from the table.

What is claimed is:

1. For use in a network providing a wide-area LAN service which allows communications to be performed between a plurality of second networks via a first network, a MAC address learning apparatus comprising edge switches located in said first network and connected to said second networks, wherein each of said edge switches comprises:

a tentative learning registration means which, when a packet whose source MAC address and receiving port are not yet learned is received from said first network, registers said source MAC address and said receiving port in a tentatively learned state;

a learned state changing means which, when a packet whose destination MAC address is registered in a learned state is received from an associated one of said second networks, changes the learned state of said destination MAC address to a permanently learned state; and a permanent learning registration means which, when a packet whose destination MAC address is registered in a learned state is received from said first network, registers the source MAC address and receiving port of the packet received from said first network in a permanently learned state.

2. A MAC address learning apparatus as claimed in claim 1, wherein said tentative learning registration means comprises:

a first-network-side receive packet control section which, when said packet is first received from said first network, makes a request that the source MAC address and receiving port of said received packet be registered in the tentatively learned state into a MAC address learning table at the side of said first network; and a first-network-side learning table control section which, when said source MAC address is not registered in said MAC address learning table at the side of said first network, registers said MAC address and said receiving port in the tentatively learned state into said MAC address learning table at the side of said first network.

3. A MAC address learning apparatus as claimed in claim 1, wherein said learned state changing means comprises:

a first-network-side learning table searching section which searches a MAC address learning table at the side of said first network by using the destination MAC address of said packet received from said associated one of said second networks and, when said destination MAC address is found registered in a tentatively learned state in said MAC address learning table at the side of said first network, then makes a request that the learned state of said destination MAC address be changed to the permanently learned state; and a first-network-side learning table control section which updates the registration of said destination MAC address to the permanently learned state.

4. A MAC address learning apparatus as claimed in claim 1, wherein said permanent learning registration means comprises:

a second-network-side learning table searching section which searches a MAC address learning table at the side of said second network by using the destination MAC address of said packet received from said first network and, when said destination MAC address is found registered in said MAC address learning table at the side of said second network, then makes a request that the source address and receiving port of said received packet be registered in the permanently learned state; and a first-network-side learning table control section which updates the registration of said destination MAC address to the permanently learned state when said destination MAC address is found registered in a tentatively learned state in said MAC address learning table at the side of said first network.

5. A MAC address learning apparatus as claimed in claim 1, wherein each of said edge switches comprises: a MAC address learning table at the side of said first network which stores learned contents of the MAC address of the packet received from said first network; an aging time management section which manages a timeout period specific to each rank of learned information registered in said MAC address learning table at the side of said first network; and a first-network-side learning table control section which sets, in said MAC address learning table at the side of said first network, a result obtained by querying said aging time management section about rank-specific aging time.

6. A MAC address learning apparatus as claimed in claim 2, comprising a first-network-side learning table control section which, when a learning registration request is received from said first-network-side receive packet control section while said MAC address learning table at the side of said first network is full, registers said requested learned information by deleting learned information currently registered in a tentatively learned state in said MAC address learning table at the side of said first network.

7. A MAC address learning method for use in a network providing a wide-area LAN service which allows communications to be performed between a plurality of second networks via a first network, wherein each of edge switches located in said first network and connected to said second networks performs control so that:

when a packet whose source MAC address and receiving port are not yet learned is received from said first network, said source MAC address and said receiving port are registered in a tentatively learned state;

when a packet whose destination MAC address is registered in a learned state is received from an associated one of said second networks, the learned state of said destination MAC address is changed to a permanently learned state; and when a packet whose destination MAC address is registered in a learned state is received from said first network, the source MAC address and receiving port of the packet received from said first network are registered in a permanently learned state.

8. A MAC address learning method as claimed in claim 7, wherein registering in the tentatively learned state comprises:

when said packet is first received from said first network, then making a request that the source MAC address and receiving port of said received packet be registered in the tentatively learned state into a MAC address learning table at the side of said first network; and when said source MAC address is not registered in said MAC address learning table at the side of said first network, then registering said MAC address and said receiving port in the tentatively learned state into said MAC address learning table at the side of said first network.

9. A MAC address learning method as claimed in claim 7, wherein changing the learned state comprises:

searching a MAC address learning table at the side of said first network by using the destination MAC address of said packet received from said associated one of said second networks and, when said destination MAC address is found registered in a tentatively learned state in said MAC address learning table at the side of said first network, then making a request that the learned state of said destination MAC address be changed to the permanently learned state; and updating the registration of said destination MAC address to the permanently learned state.

10. A MAC address learning method as claimed in claim 7, wherein registering in the permanently learned state comprises:

searching a MAC address learning table at the side of said second network by using the destination MAC address of said packet received from said first network and, when said destination MAC address is found registered in said MAC address learning table at the side of said second network, then making a request that the source address and receiving port of said received packet be registered in the permanently learned state; and updating the registration of said destination MAC address to the permanently learned state when said destination MAC address is found registered in a tentatively learned state in said MAC address learning table at the side of said first network.

11. A MAC address learning method as claimed in claim 7, wherein each of said edge switches stores learned contents of the MAC address of the packet received from said first network, manages a timeout period specific to each rank of learned information registered in said MAC address learning table at the side of said first network, and sets in said MAC address learning table at the side of said first network a result obtained by querying said aging time management section about rank-specific aging time.

12. A MAC address learning method as claimed in claim 8, wherein when a learning registration request is received from said first-network-side receive packet control section while said MAC address learning table at the side of said first network is full, said requested learned information is registered by deleting learned information currently registered in a tentatively learned state in said MAC address learning table at the side of said first network.

* * * * *